US006873981B2

(12) United States Patent
Nareddy et al.

(10) Patent No.: US 6,873,981 B2
(45) Date of Patent: Mar. 29, 2005

(54) METHOD AND SYSTEM FOR PARSING NAVIGATION INFORMATION

(75) Inventors: Krishnamohan Nareddy, Redmond, WA (US); Radha Krishna Uppala, Redmond, WA (US)

(73) Assignee: Revenue Science, Inc., Bellevue, WA (US)

(*) Notice: Subject to any disclaimer, the term of this patent is extended or adjusted under 35 U.S.C. 154(b) by 0 days.

(21) Appl. No.: 10/320,092

(22) Filed: Dec. 16, 2002

(65) Prior Publication Data

US 2003/0144988 A1 Jul. 31, 2003

Related U.S. Application Data

(62) Division of application No. 09/613,847, filed on Jul. 11, 2000.

(51) Int. Cl.[7] .............................................. G06F 17/30
(52) U.S. Cl. ........................................ 707/3; 707/200
(58) Field of Search ............................. 707/3–6, 200; 709/200, 202

(56) References Cited

U.S. PATENT DOCUMENTS

| | | | |
|---|---|---|---|
| 5,619,709 A | * 4/1997 | Caid et al. .................. 715/532 |
| 5,787,425 A | 7/1998 | Bigus |
| 5,796,633 A | 8/1998 | Burgess et al. |
| 5,864,871 A | 1/1999 | Kitain et al. |
| 5,899,992 A | 5/1999 | Iyer et al. |
| 5,905,985 A | 5/1999 | Malloy et al. |
| 5,930,786 A | 7/1999 | Carino et al. |
| 5,960,428 A | 9/1999 | Lindsay et al. |
| 5,987,135 A | 11/1999 | Johnson et al. |
| 6,000,832 A | 12/1999 | Franklin et al. |
| 6,003,024 A | 12/1999 | Bair et al. |
| 6,078,924 A | 6/2000 | Ainsbury et al. |
| 6,094,672 A | * 7/2000 | Willie et al. ................ 709/202 |
| 6,105,020 A | 8/2000 | Lindsay et al. |
| 6,112,238 A | * 8/2000 | Boyd et al. ................. 709/224 |
| 6,151,584 A | 11/2000 | Papierniak et al. |
| 6,151,601 A | 11/2000 | Papierniak et al. |
| 6,157,618 A | * 12/2000 | Boss et al. .................. 370/252 |

(Continued)

OTHER PUBLICATIONS

Kimball, Ralph, "The Data Warehouse Toolkit," John Wiley & Sons, Inc. 1996 (pp. 89–142).
U.S. Appl. No. 09/876,845, Uppala et al., filed Jun. 6, 2001.
U.S. Appl. No. 09/876,844, Fayyad et al., filed Jun. 6, 2001.
U.S. Appl. No. 09/876,837, Fayyad et al., filed Jun. 6, 2001.
U.S. Appl. No. 10/320,171, Nareddy et al., filed Dec. 16, 2002.
U.S. Appl. No. 10/320,288, Nareddy et al., filed Dec. 16, 2002.
U.S. Appl. No. 10/320,091, Nareddy et al., filed Dec. 16, 2002.
U.S. Appl. No. 10/320,092, Nareddy et al., filed Dec. 16, 2002.

Primary Examiner—Uyen Le
Assistant Examiner—Hanh Thai
(74) Attorney, Agent, or Firm—Perkins Coie LLP

(57) ABSTRACT

A method and system for providing customers with access to and analysis of event data is provided. The event data may be stored in log files and supplemented with data from other sources, such as product databases and customer invoices. A data warehouse system collects customer data from the customer web sites and stores the data at a data warehouse server. The data warehouse server interacts with the customer servers to collect to the customer data on a periodic basis. The data warehouse server may provide instructions to the customer servers identifying the customer data that is to be uploaded to the data warehouse server. When the data warehouse server receives customer data, it converts the customer data into a format that is more conducive to processing by decision support system applications by which customers can analyze their data.

12 Claims, 19 Drawing Sheets

U.S. PATENT DOCUMENTS

| | | |
|---|---|---|
| 6,178,418 B1 | 1/2001 | Singer |
| 6,192,357 B1 * | 2/2001 | Krychniak ............... 707/2 |
| 6,192,364 B1 | 2/2001 | Baclawski |
| 6,199,063 B1 | 3/2001 | Colby et al. |
| 6,205,447 B1 | 3/2001 | Malloy |
| 6,233,573 B1 | 5/2001 | Bair et al. |
| 6,282,431 B1 * | 8/2001 | Konno ............... 455/425 |
| 6,289,342 B1 * | 9/2001 | Lawrence et al. ........ 707/7 |
| 6,341,290 B1 | 1/2002 | Lombardo et al. |
| 6,408,292 B1 | 6/2002 | Bakalash et al. |
| 6,446,086 B1 * | 9/2002 | Bartlett et al. ........... 707/200 |
| 6,460,037 B1 | 10/2002 | Weiss et al. |
| 6,470,386 B1 | 10/2002 | Combar et al. |
| 6,477,564 B1 | 11/2002 | Freyssinet et al. |
| 6,502,132 B1 | 12/2002 | Kumano et al. |
| 6,519,585 B1 * | 2/2003 | Kohli ............... 707/3 |
| 6,553,416 B1 | 4/2003 | Chari et al. |
| 6,584,464 B1 * | 6/2003 | Warthen ............... 707/4 |
| 6,618,719 B1 * | 9/2003 | Andrei ............... 707/2 |
| 2002/0188584 A1 | 12/2002 | Ghannam et al. |

* cited by examiner

METHOD AND SYSTEM FOR PARSING NAVIGATION INFORMATION

CROSS-REFERENCE TO RELATED APPLICATION

This application is a divisional of U.S. patent application Ser. No. 09/613,847 entitled "METHOD AND SYSTEM FOR PARSING NAVIGATION INFORMATION," filed on Jul. 11, 2000, which application is hereby incorporated by reference in its entirety.

TECHNICAL FIELD

The described technology relates to analyzing of data relating to events generated by a computer program.

BACKGROUND

Today's computer networking environments, such as the Internet, offer mechanisms for delivering documents between heterogeneous computer systems. One such network, the World Wide Web network, which comprises a subset of Internet sites, supports a standard protocol for requesting and receiving documents known as web pages. This protocol is known as the Hypertext Transfer Protocol, or "HTTP." HTTP defines a message passing protocol for sending and receiving packets of information between diverse applications. Details of HTTP can be found in various documents including T. Berners-Lee et al., *Hypertext Transfer Protocol—HTTP* 1.0, Request for Comments (RFC) 1945, MIT/LCS, May 1996. Each HTTP message follows a specific is layout, which includes among other information, a header which contains information specific to the request or response. Further, each HTTP request message contains a universal resource identifier (a "URI"), which specifies to which network resource the request is to be applied. A URI is either a Uniform Resource Locator ("URL") or Uniform Resource Name ("URN"), or any other formatted string that identifies a network resource. The URI contained in a request message, in effect, identifies the destination machine for a message. URLs, as an example of URIs, are discussed in detail in T. Berners-Lee, et al., *Uniform Resource Locators* ((URL), RFC 1738, CERN, Xerox PARC, Univ. of Minn., December 1994.

FIG. 1 illustrates how a browser application enables users to navigate among nodes on the web network by requesting and receiving web pages. For the purposes of this discussion, a web page is any type of document that abides by the HTML format. That is, the document includes an "<HTML>" statement. Thus, a web page is also referred to as an HTML document. The HTML format is a document mark-up language, defined by the Hypertext Markup Language ("HTML") specification. HTML defines tags for specifying how to interpret the text and images stored in an HTML document. For example, there are HTML tags for defining paragraph formats and for emboldening and underlining text. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language*—2.0, RFC 1866, MIT/W3C, November 1995.

In FIG. 1, a web browser application 101 is shown executing on a client computer 102, which communicates with a server computer 103 by sending and receiving HTTP packets (messages). HTTP messages may also be generated by other types of computer programs, such as spiders and crawlers. The web browser "navigates" to new locations on the network to browse (display) what is available at these locations. In particular, when the web browser "navigates" to a new location, it requests a new document from the new location (e.g., the server computer) by sending an HTTP-request message 104 using any well-known underlying communications wire protocol. The HTTP-request message follows the specific layout discussed above, which includes a header 105 and a URI field 106, which specifies the network location to which to apply the request. When the server computer specified by URI receives the HTTP-request message, it interprets the message packet and sends a return message packet to the source location that originated the message in the form of an HTTP-response message 107. It also stores a copy of the request and basic information about the requesting computer in a log file. In addition to the standard features of an HTTP message, such as the header 108, the HTTP-response message contains the requested HTML document 109. When the HTTP-response message reaches the client computer, the web browser application extracts the HTML document from the message, and parses and interprets (executes) the HTML code in the document and displays the document on a display screen of the client computer as specified by the HTML tags. HTTP can also be used to transfer other media types, such as the Extensible Markup Language ("XML") and graphics interchange format ("GIF") formats.

The World Wide Web is especially conducive to conducting electronic commerce ("e-commerce"). E-commerce generally refers to commercial transactions that are at least partially conducted using the World Wide Web. For example, numerous web sites are available through which a user using a web browser can purchase items, such as books, groceries, and software. A user of these web sites can browse through an electronic catalog of available items to select the items to be purchased. To purchase the items, a user typically adds the items to an electronic shopping cart and then electronically pays for the items that are in the shopping cart. The purchased items can then be delivered to the user via conventional distribution channels (e.g., an overnight courier) or via electronic delivery when, for example, software is being purchased. Many web sites are also informational in nature, rather than commercial in nature. For example, many standards organizations and governmental organizations have web sites with a primary purpose of distributing information. Also, some web sites (e.g., a search engine) provide information and derive revenue from advertisements that are displayed.

The success of any web-based business depends in large part on the number of users who visit the business's web site and that number depends in large part on the usefulness and ease-of-use of the web site. Web sites typically collect extensive information on how its users use the site's web pages. This information may include a complete history of each HTTP request received by and each HTTP response sent by the web site. The web site may store this information in a navigation file, also referred to as a log file or click stream file. By analyzing this navigation information, a web site operator may be able to identify trends in the access of the web pages and modify the web site to make it easier to use and more useful. Because the information is presented as a series of events that are not sorted in a useful way, many software tools are available to assist in this analysis. A web site operator would typically purchase such a tool and install it on one of the computers of the web site. There are several drawbacks with the use of such an approach of analyzing navigation information. First, the analysis often is given a low priority because the programmers are typically busy with the high priority task of maintaining the web site. Second, the tools that are available provide little more than standard reports relating to low-level navigation through a web site. Such reports are not very useful in helping a web site operator to visualize and discover high-level access trends. Recognition of these high-level access trends can help a web site operator to design the web site. Third, web sites are typically resource intensive, that is they use a lot of computing resources and may not have available resources to effectively analyze the navigation information.

It would also be useful to analyze the execution of computer programs, other than web server programs. In particular, many types of computer programs generate events that are logged by the computer programs themselves or by other programs that receive the events. If a computer program does not generate explicit events, another program may be able to monitor the execution and generate events on behalf of that computer program. Regardless of how event data is collected, it may be important to analyze that data. For example, the developer of an operating system may want to track and analyze how the operating system is used so that the developer can focus resources on problems that are detected, optimize services that are frequently accessed, and so on. The operating system may generate a log file that contains entries for various types of events (e.g., invocation of a certain system call).

SUMMARY

A method in a computer system for providing information relating to entries of log files is provided. The method receives a plurality of log files. For each entry of each log file, the method determines whether the entry contains a query. When it is determined that the entry contains a query, the method normalizes the query and stores the normalized query in a database in association with other information of the entry. The method receives from a user a request for information based on analysis the log files. The method identifies information responsive to the received request based on the normalized queries stored in the database and sends the identified information to the user.

DETAILED DESCRIPTION

Figure 1:
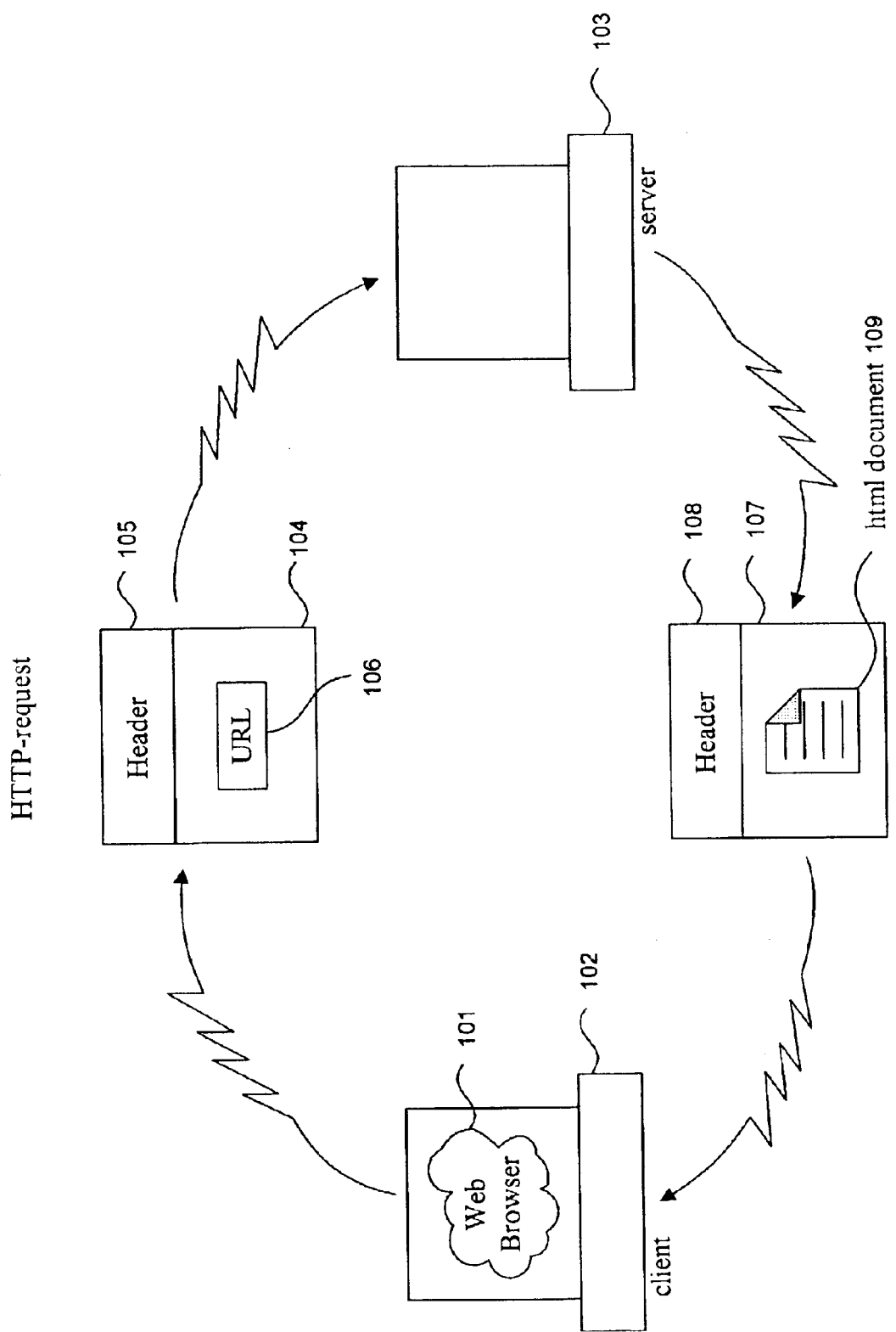
FIG. 1 illustrates how a browser application enables users to navigate among nodes on the web network by requesting and receiving web pages.

A method and system for providing customers with access to and analysis of event data (e.g., navigation data collected at customer web sites) is provided. The event data may be stored in log files and supplemented with data from other sources, such as product databases and customer invoices. In one embodiment, a data warehouse system collects customer data from the customer web sites and stores the data at a data warehouse server. The customer data may include application event data (e.g., click stream log files), user attribute data of users of the customer web site (e.g., name, age, and gender), product data (e.g., catalog of products offered for sale by the customer), shopping cart data (i.e., identification of the products currently in a user's shopping cart), and so on. The data warehouse server interacts with the customer servers to collect to the customer data on a periodic basis. The data warehouse server may provide instructions to the customer servers identifying the customer data that is to be uploaded to the data warehouse server. These instructions may include the names of the files that contains the customer data and the name of the web servers on which the files reside. These instructions may also indicate the time the day when the customer data is to be uploaded to the data warehouse server. When the data warehouse server receives customer data, it converts the customer data into a format that is more conducive to processing by decision support system applications by which customers can analyze their data. For example, the data warehouse server may analyze low-level navigation events (e.g., each HTTP request that is received by the customer web site) to identify high-level events (e.g., a user session). The data warehouse server then stores the converted data into a data warehouse. The data warehouse server functions as an application service provider that provides various decision support system applications to the customers. For example, the data warehouse server provides decision support system applications to analyze and graphically display the results of the analysis for a customer. The decision support system applications may be accessed through a web browser. In one embodiment, the customer servers are connected to the data warehouse server via the Internet and the data warehouse server provides data warehousing services to multiple customers.

The data warehouse system may provide a data processor component that converts the log files into a format that is more conducive to processing by the decision support system applications. In one embodiment, the converted data is stored in a data warehouse that includes fact and dimension tables. Each fact table contains entries corresponding to a type of fact derived from the log files. For example, a web page access fact table may contain an entry for each web page access identified in the log files. Each entry may reference attributes of the web page access, such as the identity of the web page and identity of the accessing user. The values for each attribute are stored in a dimension table for that attribute. For example, a user dimension table may include an entry for each user and the entries of the web access fact table may include a user field that contains an index (or some other reference) to the entry of the user dimension table for the accessing user. The user dimension table may contain the names of the users and other user-specific information. Alternatively, the user dimension table may itself also be a fact table that includes references to dimension tables for the attributes of users. The data warehouse may also include fact tables and dimension tables that represent high-level facts and attributes derived from the low-level facts and attributes of the log files. For example, high-level facts and attributes may not be derivable from only the data in a single log entry. For example, the higher level category (e.g., shoes or shirts) of a web page may be identified using a mapping of web page URIs to categories. These categories may be stored in a category dimension table. Also, certain facts, such as the collection of log entries that comprise a single user web access session or visit, may only be derivable by analyzing a series of log entries.

The data processor component may have a parser component and a loader component. The parser of the data processor parses and analyzes a log file and stores the resulting data in a local data warehouse that contains information for only that log file. The local data warehouse may be similar in structure (e.g., similar fact and dimension tables) to the main data warehouse used by decision support system applications. The local data warehouse may be adapted to allow efficient processing by the parser. For example, the local data warehouse may be stored in primary storage (e.g., main memory) for speed of access, rather than in secondary storage (e.g., disks). The parser may use parser configuration data that defines, on a customer-by-customer basis, the high-level data to be derived from the log entries. For example, the parser configuration data may specify the mapping of URIs to web page categories. The loader of the data processor transfers the data from the local data warehouse to the main data warehouse. The loader may create separate partitions for the main data warehouse. These separate partitions may hold the customer data for a certain time period (e.g., a month's worth of data). The loader adds entries to the main fact tables (i.e., fact tables of the main data warehouse) for each fact in a local fact table (i.e., fact table of the local data warehouse). The loader also adds new entries to the main dimension tables to represent attribute values of the local dimension tables that are not already in the main dimension tables. The loader also maps the local indices (or other references) of the local dimension tables to the main indices used by the main dimension tables.

Figure 2A:
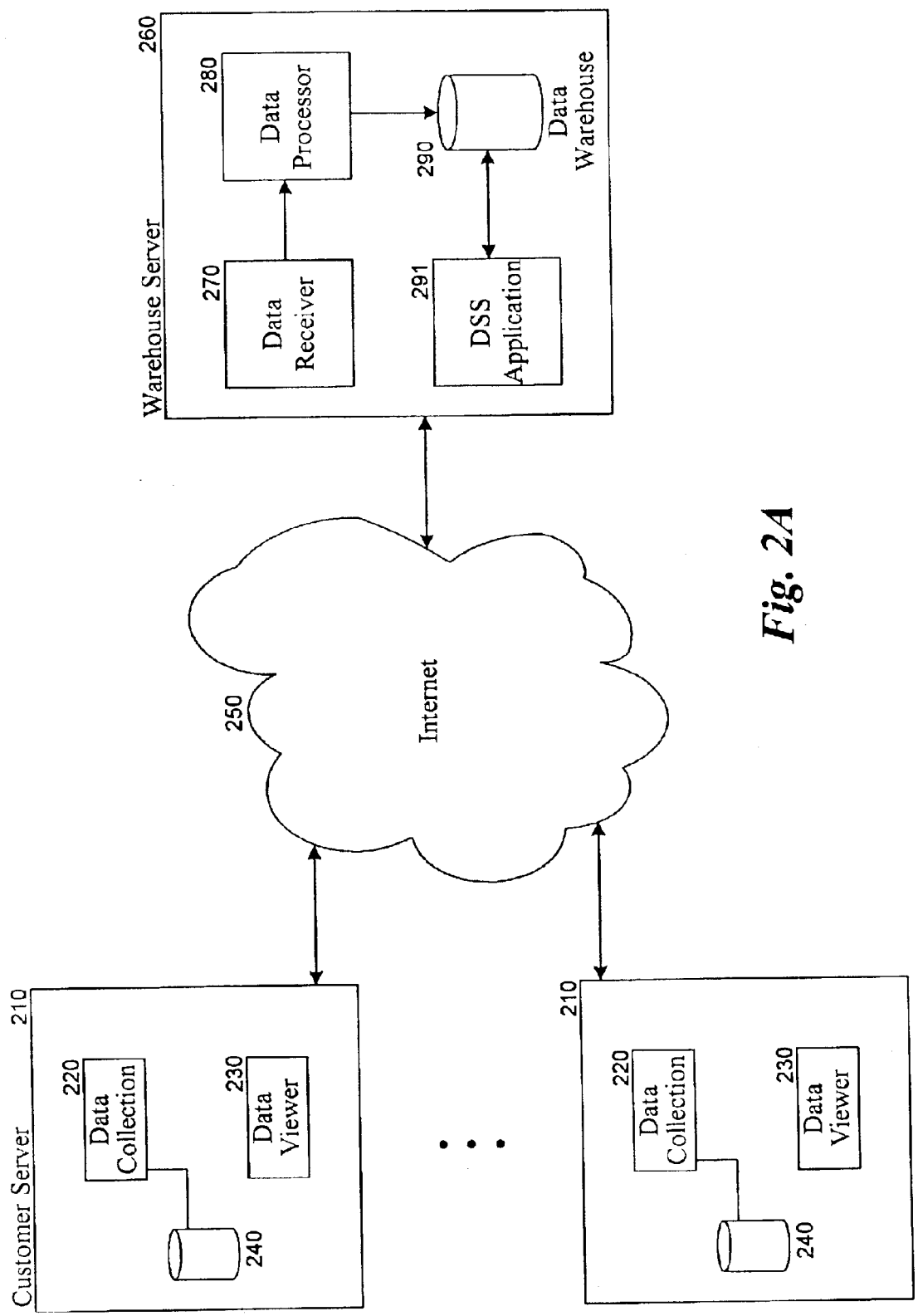
FIG. 2A is a block diagram illustrating components of the data warehouse system in one embodiment.

FIG. 2A is a block diagram illustrating components of the data warehouse system in one embodiment. The data warehouse system includes customer components that execute on the customer servers and data warehouse components that execute on the data warehouse server. The customer servers 210 and the data warehouse server 260 are interconnected via the Internet 250. Customer components executing on a customer server includes a data collection component 220 and a data viewer 230. The data viewer may reside on a client computer of the customer, rather than a server. The data collection component collects the customer data from the storage devices 240 of the customer servers. The data viewer provides access for viewing of data generated by the decision support system applications of the data warehouse server. In one embodiment, the data viewer may be a web browser. The data warehouse server includes a data receiver component 270, the data processor component 280, the data warehouse 290, and decision support system applications 291. The data receiver component receives customer data sent by tile data collection components executing at the various customer web sites. The data processor component processes the customer data and stores it in the data warehouse. The decision support system application provides the customer with tools for analyzing and reviewing the customer data that is stored in the main data warehouse. Analysis performed on and reports generated from are described in U.S. patent application Ser. No. 09/638,836, entitled "Identifying and Reporting on Combinations of Events in Usage Data," now abandoned and U.S. patent application Ser. No. 09/613,866, entitled "Extracting and Displaying Usage Data for Graphical Structures," now abandoned which are being filed concurrently and which are hereby incorporated by reference. In one embodiment, each customer has its own set of dimension and fact tables so that the information of multiple customers are not intermingled.

Figure 2B:
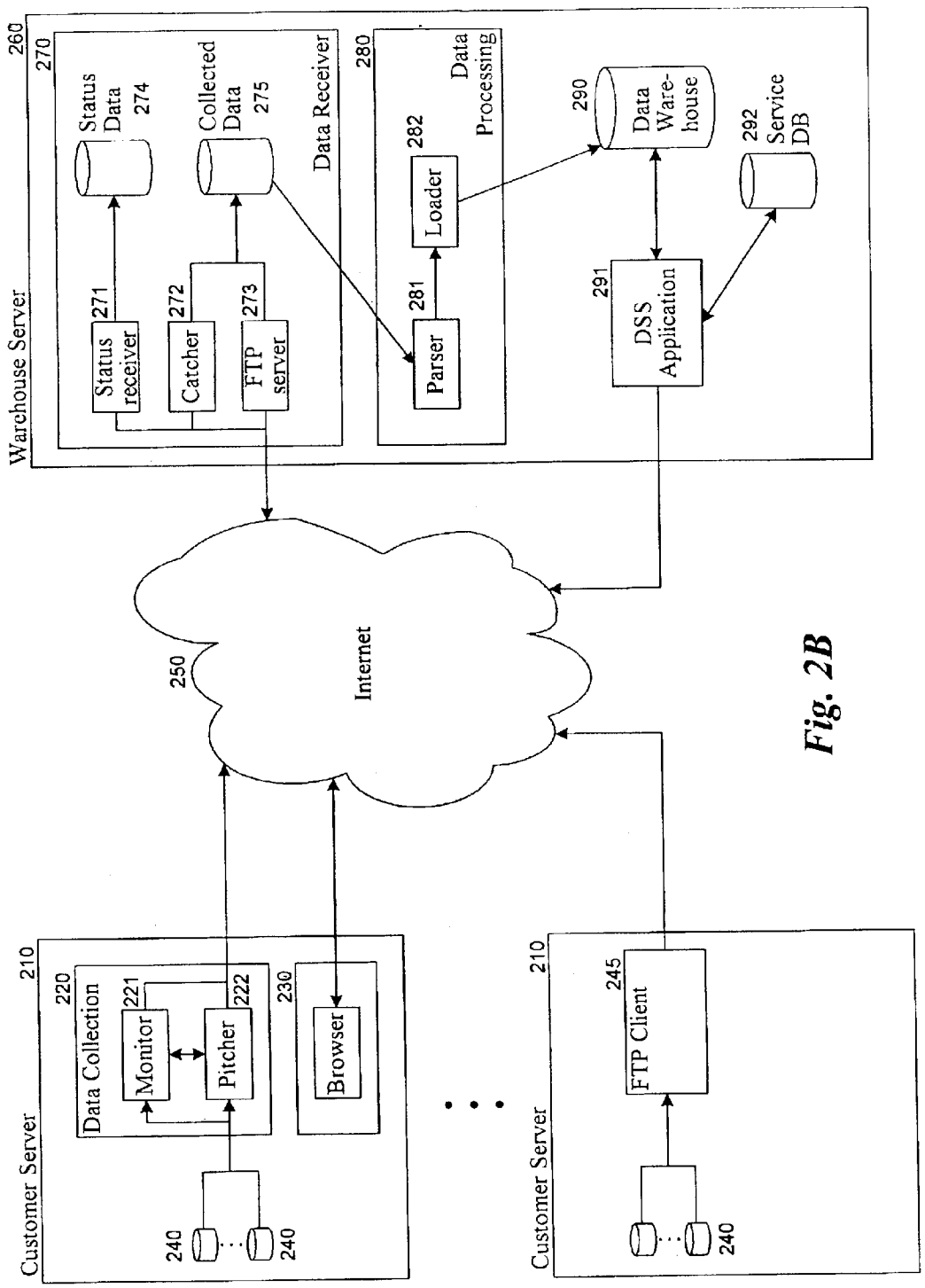
FIG. 2B is a block diagram illustrating details of the components of the data warehouse system in one embodiment.

FIG. 2B is a block diagram illustrating details of the components of the data warehouse system in one embodiment. The data collection component 220 includes a monitor sub-component 221 and a pitcher sub-component 222. The data collection component is described in more detail in U.S. patent application Ser. No. 09/613,845, entitled "Method and System for Monitoring Resource via the Web," now abandoned which is being filed concurrently and which is hereby incorporated by reference. The pitcher is responsible for retrieving instructions from the data warehouse server, collecting the customer data in accordance with the retrieved instructions, and uploading the customer data to the data warehouse server. The monitor is responsible for monitoring the operation of the pitcher and detecting when the pitcher may have problems in collecting and uploading the customer data. When the monitor detects that a problem may occur, it notifies the data warehouse server so that corrective action may be taken in advance of the collecting and uploading of the customer data. For example, the pitcher may use certain log on information (e.g., user ID and password) to access a customer web server that contains customer data to be uploaded. The monitor may use that log on information to verify that the log on information will permit access to the customer data. Access may be denied if, for example, a customer administrator inadvertently deleted from the customer web server the user ID used by the pitcher. When the monitor provides advance notification of a problem, the problem might be corrected before the pitcher attempts to access the customer data. The monitor also periodically checks the pitcher to ensure that the pitcher is executing and, if executing, executing correctly.

The data receiver component of the data warehouse server includes a status receiver sub-component 271, a catcher sub-component 272, an FTP server 273, a status database 274, and a collected data database 275. The status receiver receives status reports from the customer servers and stores the status information in the status database. The catcher receives and processes the customer data that is uploaded from the customer web sites and stores the data in the collected data database. The data processor component includes a parser sub-component 281 and a loader sub-component 282. The parser analyzes the low-level events of the customer data and identifies high-level events and converts the customer data into a format that facilitates processing by the decision support system applications. The loader is responsible for storing the identified high-level events in the data warehouse 290. In one embodiment, a customer may decide not to have the data collection component executing on its computer systems. In such a case, the customer server may include an FTP client 245 that is responsible for periodically transferring the customer data to the FTP server 273 of the data warehouse server. The data receiver may process this customer data at the data warehouse server in the same way as the pitcher processes the data at the customer servers. The processed data is then stored in the collected data database.

Figure 3:
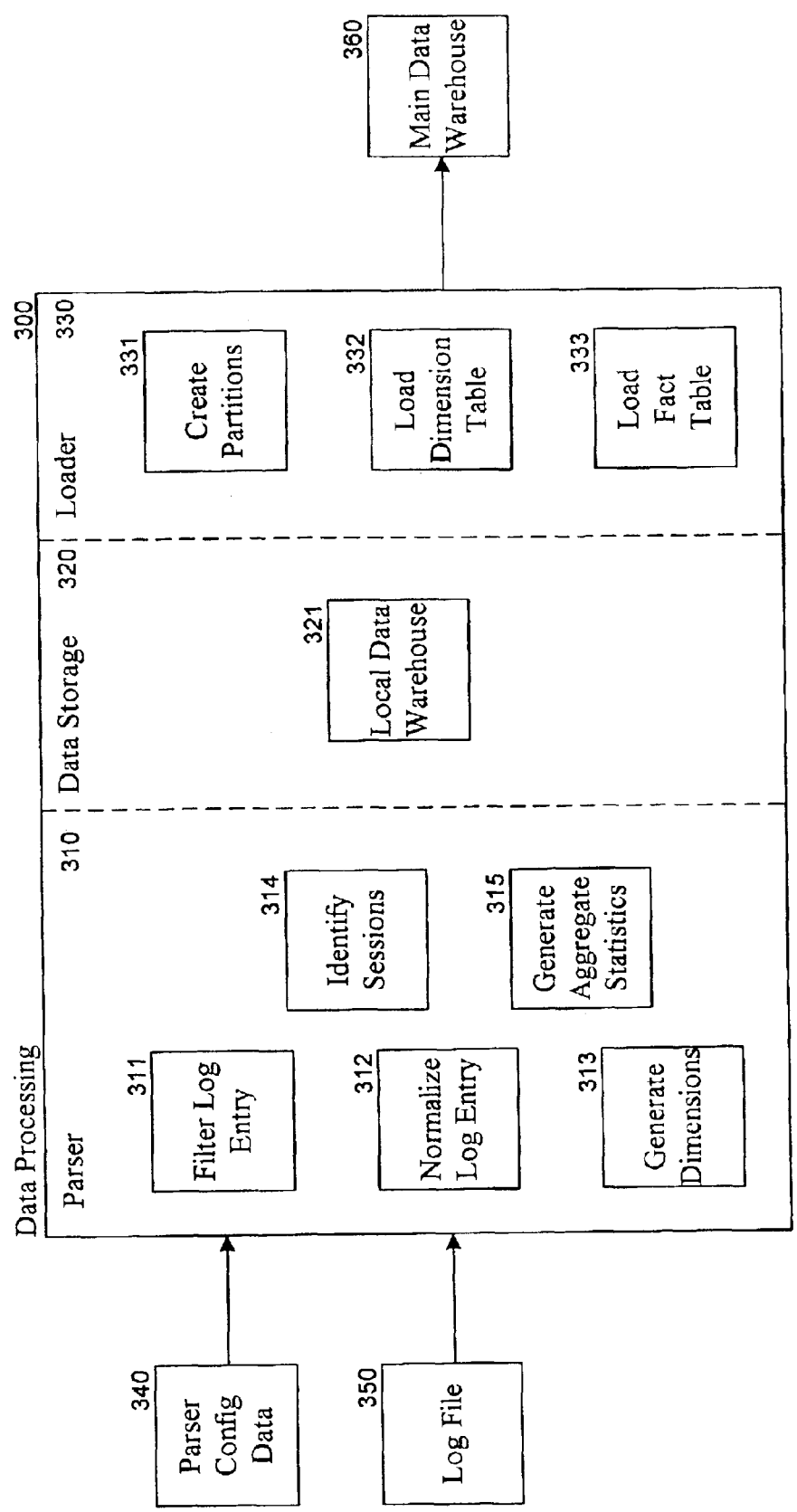
FIG. 3 is a block diagram illustrating the sub-components of the data processor component in one embodiment.

FIG. 3 is a block diagram illustrating the sub-components of the data processor component in one embodiment. The data processor component 300 includes a parser 310, data storage area 320, and a loader 330. The data processor component inputs parser configuration data 340 and a log file 350 and updates the main data warehouse 360. The parser configuration data may include a mapping of actual web sites to logical sites and a mapping of a combination of Uniform Resource Identifiers ("URIs") and query strings of the log entries to page definitions (e.g., categories) and event definitions. The parser processes the entries of the log file to generate facts and dimensions to eventually be stored in the main data warehouse. The parser identifies events in accordance with the parser configuration data. Tile parser includes a filter log entry component 311, a normalize log entry component 312, a generate dimensions component 313, an identify sessions component 314, and a generate aggregate statistics component 315. The filter log entry component identifies which log entries should not be included in the main data warehouse. For example, a log entry that has an invalid format should not be included. The normalize log entry component normalizes the data in a log entry. For example, the component may convert all times to Greenwich Mean Time ("GMT"). The generate dimensions component identifies the various dimensions related to a log entry. For example, a dimension may be the Uniform Resource Identifier of the entry or the logical site identifier. The identify sessions component processes the parsed log file data stored in the local data warehouse to identify user sessions. A user session generally refers to the concept of a series of web page accesses that may be related in some way, such as by temporal proximity. The generate aggregate statistics component aggregates data for the log file being processed as each log entry is processed or after the log file is parsed. The data storage area 320 includes a local data warehouse 321. In one embodiment, the local data warehouse is stored non-persistently (or temporarily) in main memory of the computer system. The local data warehouse may contain fact tables and dimension tables that correspond generally to the tables of the main data warehouse 360. The loader retrieves the information from the local data warehouse and stores the information in the main data warehouse. The loader includes a create partitions component 331, a load dimension table component 332, and a load fact table component 333. The create partitions components creates new partitions for the main data warehouse. A partition may correspond to a collection of information within a certain time range. For example, the main data warehouse may have a partition for each month, which contains all the data for that month. The load dimension table component and the load fact table component are responsible for loading the main data warehouse with the dimensions and facts that are stored in the local data warehouse.

In one embodiment, the log file is a web server log file of a customer. The log file may be in the "Extended Log File Format" as described in the document "http://www.w3.org/TR/WD-logfile-960323" provided by the World Wide Web Consortium, which is hereby incorporated by reference. According to that description, the log file contains lines that are either directives or entries. An entry corresponds to a single HTTP transaction (e.g., HTTP request and an HTTP response) and consists of a sequence of fields (e.g., integer, fixed, URI, date, time, and string). The meaning of the fields in an entry is specified by a field directive specified in the log file. For example, a field directive may specify that a log entry contains the fields date, time, client IP address, server IP address, and success code. Each entry in the log file would contain these five fields.

The parser configuration data defines logical sites, page definitions, and event definitions. A logical site is a collection of one or more IP addresses and ports that should be treated as a single web site. For example, a web site may actually have five web servers with different IP addresses that handle HTTP requests for the same domain. These five IP addresses may be mapped to the same logical site to be treated as a single web site. The page definitions define the format of the URIs of log entries that are certain page types. For example, a URI with a query string of "category=shoes" may indicate a page type of "shoes." Each event definition defines an event type and a value for that event type. For example, a log entry with a query string that includes "search=shoes" represents an event type of "search" with an event value of "shoes." Another log entry with a query string of "add=99ABC" may represent an event type of "add" an item to the shopping cart with an event value of item number "99ABC."

Figure 4:
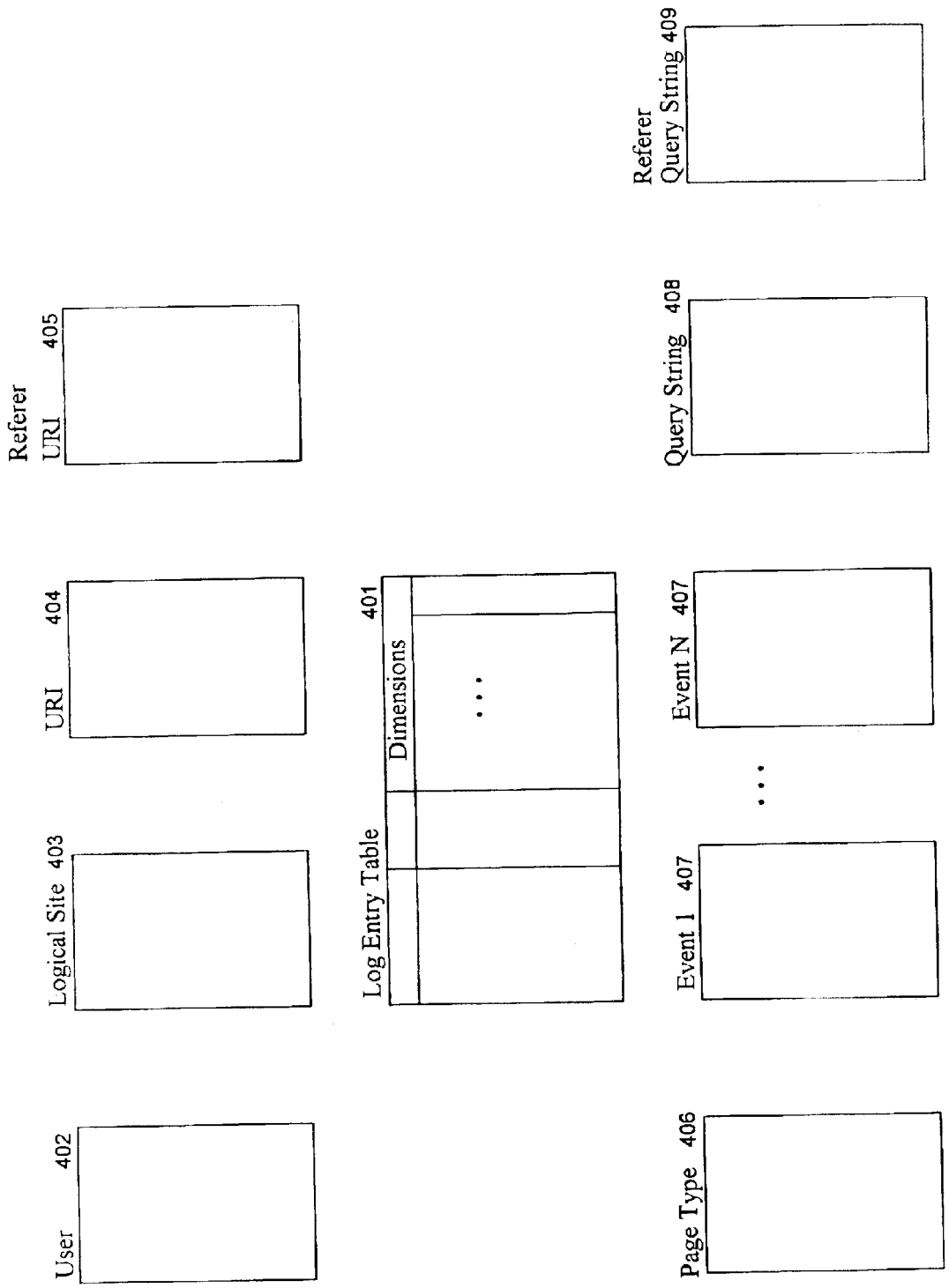
FIG. 4 is a block diagram illustrating some of the tables of the local data warehouse and the main data warehouse in one embodiment.

FIG. 4 is a block diagram illustrating some of the tables of the local data warehouse and the main data warehouse in one embodiment. These data warehouses are databases that include fact tables and dimension tables. A fact table contains an entry for each instance of fact (e.g., web page access). A dimension table contains an entry for each possible attribute value of an attribute (e.g., user). The entries of a fact table contain dimension fields that refer to the entries into the dimension tables for their attribute values. A table may be both a fact table and a dimension table. For example, a user dimension table with an entry for each unique user may also be a fact table that refers to attributes of the users that are stored in other dimension tables. The data warehouses contain a log entry table 401, a user table 402, a logical site table 403, a URI table 404, a referrer URI table 405, a page type table 406, event type tables 407, a query string table 408, and a referrer query string table 409. The log entry table is a fact table that contains an entry for each log entry that is not filtered out by the parser. The other tables are dimension tables for the log entry table. The user table contains an entry for each unique user identified by the parser. The logical site table contains an entry for each logical site as defined in the parser configuration data. The URI table contains an entry for each unique URI of an entry in the log entry table. The referrer URI table contains an entry for each referrer URI of the log entry table. The page type table contains an entry for each page type identified by the parser as defined in the parser configuration data. The data warehouse contains an event table for each type of event defined in the parser configuration data. Each event table contains an entry for each event value of that event type specified in an entry of the log entry table. The query sting table contains an entry for each unique query string identified in an entry of the log entry table. The referrer query string contains an entry for each unique referrer query string identified in an entry of the log entry table.

Table 1 is an example portion of a log file. The "#fields" directive specifies the meaning of the fields in the log entries. Each field in a log entry is separated by a space and an empty field is represented by a hyphen. The #fields directive in this example indicates that each entry includes the date and time when the transaction was completed (i.e., "date" and "time"), the client IP address (i.e., "c-ip"), and so on. For example, the first log entry has a data and time of "2000-06-01 07:00:04" and a client IP address of "165.21.83.161."

query string pattern to a page type. For example, the entry "PAGEKEYDEFINITION=news item, news item, 1, {prefix}=homepage_include/industrynews_detail.asp, <NewsItemID>#{Uri}" indicates that a page type of "news item" is specified for logical site 1 by a URI pattern of "/homepage$_{13}$ include/industrynews_detail.asp." The definition also indicates that the event value is "<NewsItemID>#{Uri}," where the URI of the log entry is substituted for "{Uri} and the value of NewsItemID in the query string is substituted for "<NewsItemID>." The event type definitions map a site identifier, URI pattern, and query string pattern to an event type and value. The definitions also specify the name of the event type and the name of the dimension table for that event type. For example, the entry "EVENTDEFINITION=View News Article, View News

TABLE 1

Software: Microsoft Internet Information Server 4.0
Version: 1.0
Date: 2000-06-01 07:00:04
Fields: date time c-ip cs-username s-sitename s-computername s-ip cs-method cs-uri-stem cs-uri-query sc-status sc-win32-
status sc-bytes cs-bytes time-taken s-port cs-version cs(User-Agent) cs(Cookie) cs(Referrer)
2000-06-01 07:00:04 165.21.83.161 - W3SVC2 COOK_002 COOK_002 206.191.163.41 GET /directory/28.ASP - 200 0 148428 369
9714 80 HTTP/1.0 Mozilla/3.04+(Win95;+1) ASPSESSIONIDQQGGQGPG=JBCCFIPBBHHDANBAFFIGLGPH
http://allrecipes.com/Default.asp
2000-06-01 07:00:20 4.20.197.70 - W3SVC2 COOK_002 206.191.163.41 GET /default.asp - 302 0 408 259 30 80
HTTP:/1.0 Mozilla/4.0+(compatible;+Keynote-Perspective+4.0) - -
2000-06-01 07:00:20 4.20.197.70 - W3SVC2 COOK_002 206.191.163.41 GET /Default.asp - 200 0 41245 266 200 80
HTTP/1.0 Mozilla/4.0+(compatible;+Keynote-Perspective+4.0) - -
200-06-01 07:00:27 204.182.65.192 - W3SVC2 COOK_002 206.191.163.41 HEAD /Default.asp - 302 0 254 66 40 80
HTTP/1.0 lpswitch_WhatsUp/3.0 - -
200-06-01 07:00:32 24.10.69.137 - W3SVC2 COOK_002 206.191.163.41 GET /directory/541.asp - 200 0 22427 459 421
80 HTTP/1.0 Mozilla/4.7+[en]+(Win98;+U) ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;+ARSites=ALR=1
http://allrecipes.com/directory/34.asp
2000-06-01 07:00:34 192.102.216.101 - W3SVC2 COOK_002 206.191.163.41 GET /encyc/terms/L/7276.asp - 200 0
20385 471 290 80 HTTP/1.0 Mozilla/4.7+[en]+(X11;+1;+SunOS+5.5.1+sun4u) ASPSESSIONIDQQGGQGPG=
PKBCFIPBIKONBPDHKDMMEHCE http://search.allrecipes.com/gsearchresults.asp?site=allrecipes&allrecipes=allrecipes&
allsites=1&q1=loin
2000-06-01 07:00:34 216.88.216.227 - W3SVC2 COOK_002 206.191.163.41 GET /default.asp - 200 0 41253 258 180 80
HTTP/1.1 Mozilla/4.0+(compatible;+MSIE+4.01;+MSN+2.5;+MSN+2.5;+Windows+98) - -
200-06-01 07:00:36 199.203.4.10 - W3SVC2 COOK_002 206.191.163.41 GET /Default.asp - 302 0 408 485 30 80
HTTP/1.0 Mozilla/4.0+(compatible;+MSIE;+5.01;+Windows+98;+TUCOWS) SITESERVER=ID=22f117fb3708b2278f3c
426796a78e2a -
2000-06-01 07:00:37 199.203.4.10 - W3SVCC2 COOK_002 206.191.163.41 GET /Default.asp - 200 0 41277 492 421 80
HTTP/1.0 Mozilla/4.0+(compatible;+MSIE;+5.01;+Windows+98;+TUCOWS) SITESERVER=ID=22f117fb3708b2278f3c
426796a78e2a -
2000-06-01 07:00:43 24.10.69.137 - W3SVC2 COOK_002 206.191.163.41 GET /directory/34.asp - 200 0 17835 458 320
80 HTTP/1.0 Mozilla/4.7+[en]+(Win98;+U)ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;+ARSites=ALR=1 http://allrecipes.
com/directory/25.asp
2000-06-01 07:00:47 199.203.4.10 - W3SVC COOK_002 206.191.163.41 GET /jumpsite.asp
jumpsite=5&Go.x=16&Go.y=14 302 0 341 611 40 80 HTTP/1.0 Mozilla/4.0+(compatible;+MSIE+5.01;+Windows+98;+
TUCOWS) SITESERVER=ID=22f117fb3708b227813c426796a78e2a;+ASPSESSIONIDQQGGQGPG=FCCCFIPBKJM
BDJJHBNCOEDGH http://allrecipes.com/Default.asp
2000-06-01 07:00:47 24.10.69.137 - W3SVC2 COOK_002 206.191.163.41 GET /directory/538.asp - 200 0 27471 459 881
80 HTTP/1.0 Mozilla/4.7+[en]+(Win98;+U) ASPSESSIONIDQQGGQGPG=BHBCFIPBEJPNOMDPKCGLKNGC;
+ARSiteUser=1%2DC2B25364%2D3775%2D11D4%2DBAC1%2D0050049BD2E4;'ARSites=ALR=1
http://allrecipes.com/directory/34.asp
2000-06-01 07:00:47 207.136.48.117 - W3SVC2 COOK_002 206.191.163.41 GET /directory/511.asp - 200 0 77593 369
12538 80 HTTP/1.0 Mozilla/3.01Gold+(Win95;+1) ASPSESSIONDQQGGQGPG=BFACFIPBDBN PBFPBOENJKHJN;
+ARSiteUser=1%2DC2B251E5%2D3775%2D11D4%2DBAC1%2D0050049BD2E4;+ARSites=ALR=1
http://allrecipes.com/directory/506.asp
2000-06-01 07:00:49 192.102.216.101 - W3SVC COOK_002 206.191.163.41 GET /encyc/A1.asp ARRefSite=
15&ARRefCookie=1-C2B253B8-3775-11D4-BAC1-0050049BD2E4 200 0 47193 457 260 80 HTTP/1.0 Mozilla/4.7+
[en]+(X11;+1;+SunOS+5.5.1+sun4u) ASPSESSIONDQQGGQGPG=PKBCFIPBIKONBPDHKDMMEHCE
http://porkrecipe.com/hints/tips.asp Table 2 is an example portion of parser configuration data. The logical site definitions map a server IP address, port, and root URI to a logical site. For example, the entry "LOGICALSITEURIDEFINITION=209.114.94.26,80,/,1" maps all the accesses to port 80 of IP address 209.114.94.26 at URIs with a prefix "/" to logical site 1. The page type definitions map a logical site identifier, URI pattern, and Article, 1, {prefix}=/homepage_include/industrynews_detail.asp, <NewsItemId>=*, <NewsItemId>" indicates that View News Article event types are stored in the View News Article dimension table. That event type is indicated by a URI with "/homepage_include/industrynews_detail.asp," and the event value is the string that follows "<NewsItemId>=" in the query string.

TABLE 2

LOGICALSITEURIDEFINITION = 209.114.94.26, 80./.1
PAGEKEYDEFINITION= news item. news item. 1. {prefix}=/homepage_include/industrynews_detail.asp. . <NewsItemId>#{Uri}
PAGEKEYDEFINITION= page. page. 1. . . {Uri}
EVENTDEFINITION= Login. Login. 1. {prefix}=/registration/login.asp. .
EVENTDEFINITION= Logout. Logout. 1. {prefix}=/registration/logout.asp. .
EVENTDEFINITION= Register Page 1. Register Page 1. 1. {prefix}=/registration/register.asp. .
EVENTDEFINITION= Register Page 2. Register Page 2. 1. {prefix}=/registration/register2.asp. <UserID>=*.
EVENTDEFINITION= Registration Confirmation. Registration Confirmation. 1. {prefix}=/registration/register3.asp. .
EVENTDEFINITION= Abort Registration. Abort Registration. 1. {prefix}=/registration/registrationabort.asp. .
EVENTDEFINITION= Member Services. Member Services. 1. {prefix}=/registration/memberservices.asp. .
EVENTDEFINITION= Change Password. Change Password. 1. {prefix}=/registration/changepassword.asp. .
EVENTDEFINITION= Profile Edit. Profile Edit. 1. {prefix}=/registration/profile.asp. .
EVENTDEFINITION= Change Affiliation. Change Affiliation. 1. {prefix}=/registration/changeaffiliation.asp. <UserID>=*.
EVENTDEFINITION= Change Secret Question. Change Secret Question. 1. {prefix}=/registration/changesecretquestion.asp. .
EVENTDEFINITION= Forgot Information. Forgot Information. 1. {prefix}=/registration/forgotinfo.asp. .
EVENTDEFINITION= Forgot Password. Forgot Password. 1. {prefix}=/registration/forgotpassword.asp. .
EVENTDEFINITION= Forgot Signin. Forgot Signin. 1. {prefix}=/registration/forgotsignin.asp. .
EVENTDEFINITION= View News Article. View News Article. 1. {prefix}=/homepage_include/industrynews_detail.asp. <NewsItemId>=*. <NewsItemId>

Figure 5:
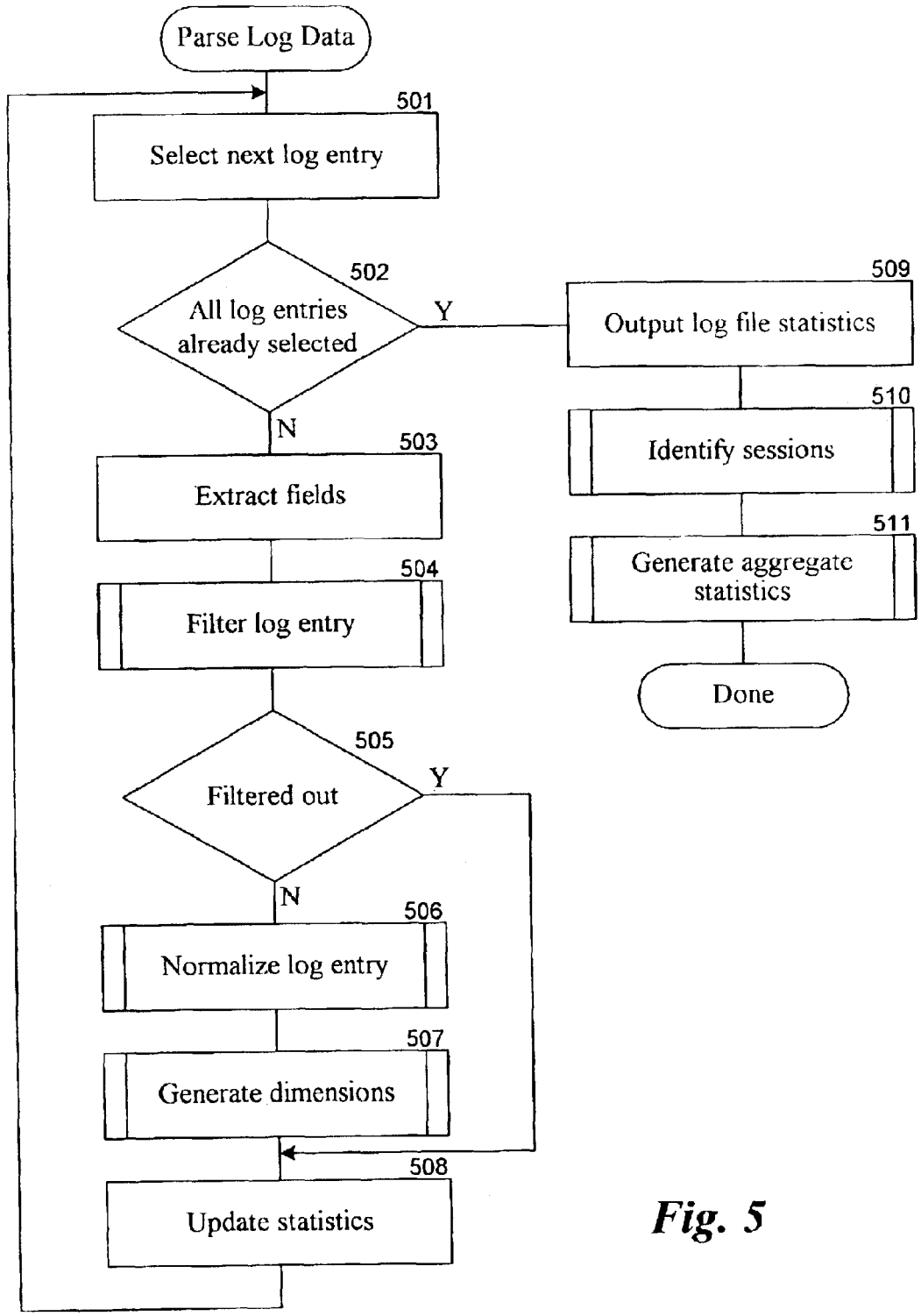
FIG. 5 is a flow diagram illustrating the parse log data routine that implements the parser in one embodiment.

FIGS. 5–14 are flow diagrams of components of the parser in one embodiment. FIG. 5 is a flow diagram illustrating the parse log data routine that implements the main routine of parser in one embodiment. The routine processes each entry in the log file based on the parser configuration data. The routine filters out certain log entries, normalizes the attribute values of the log entries, and generates entries in the dimension tables for the attributes of the log entries. After processing all the log entries, the parser identifies user sessions and generates various statistics. In blocks 501–508, the routine loops selecting and processing each log entry. In block 501, the routine selects the next log entry of the log file starling with the first log entry. The routine may also pre-process the header information of the log file to identify the fields of the log entries. In decision block 1502, if all the log entries have already been selected, then the routine continues at block 509, else the routine continues at block 503. In block 503, the routine extracts the values for the fields of the selected log entry. In block 504, the routine invokes the filter log entry routine, which returns an indication as to whether the selected log entry should be filtered out. In decision block 505, if the filter log entry routine indicates that the selected log entry should be filtered out, then the routine skips to block 508, else the routine continues at block 506. In block 506, the routine invokes the normalize log entry routine to normalize the values of the fields of the selected log entry. In block 507, the routine invokes the generate dimensions routine to update the dimension tables based on the selected log entry and to add an entry into the log entry fact table. In block 508, the routine updates the statistics for the log file. For example, the routine may track the number of log entries that have been filtered out. The routine then loops to block 501 to select the next log entry. In block 509, the routine outputs the log file statistics. In block 510, the routine invokes the identify sessions routine that scans the log entry table to identify the user sessions and updates a session dimension table. In block 511, the routine invokes the generate aggregate statistics routine to generate various statistics and then completes.

Figure 6:
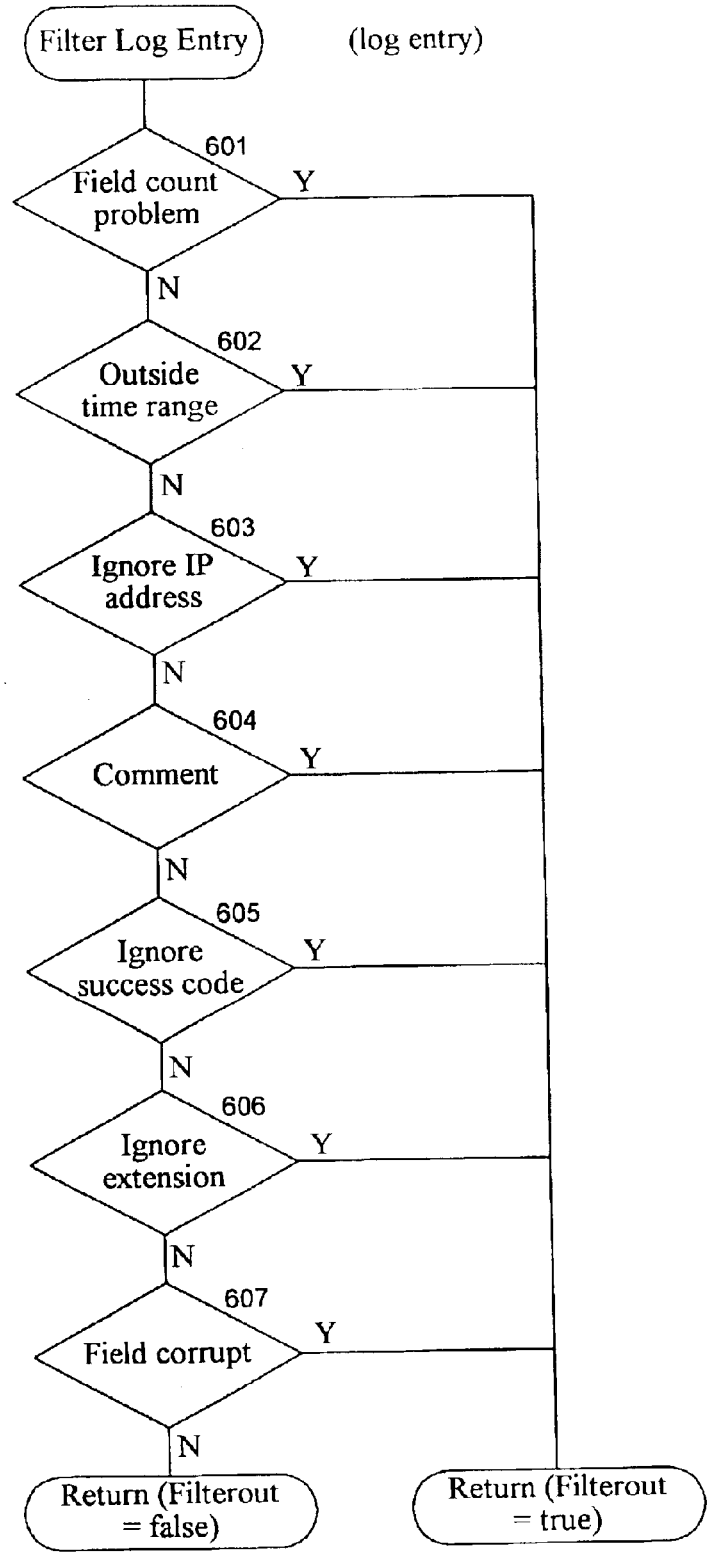
FIG. 6 is a flow diagram of the filter log entry routine in one embodiment.

FIG. 6 is a flow diagram of the filter log entry routine in one embodiment. The filter log entry routine is passed a log entry and determines whether the log entry should be filtered Out. In blocks 601–607, the routine determines whether the filter out conditions have been satisfied. In decision block 601, the routine determines whether the log entry has a field count problem. A field count problem arises when the number of fields in the log entry does not correspond to the number of expected fields for that log entry. The number and types of fields may be defined in a "fields" directive line of the log file. In decision block 609, the routine determines whether the log entry is outside of a specified time range. The routine compares the time field of the log entry to the time range. The time range may be specified so that only those log entries within that time range are processed. In decision block 603, the routine determines whether the IP address of the log entry should be ignored. For example, a log entry may be ignored if the entry originated from a server whose function is to ping the customer's web server at periodic intervals. In decision block 604, the routine determines whether the log entry corresponds to a comment (e.g., a "#remarks" directive). In decision block 605, the routine determines whether the success code associated with the log entry indicates that log entry should be ignored. For example, if the success code indicates a failure, then the log entry may be ignored. In decision block 606, the routine determines whether the log entry is requesting a resource whose extension indicates that the log entry should be ignored. For example, the routine may ignore log entries requesting graphic files, such as those in the ".gif" format. In decision block 607, the routine determines whether the values within the fields of the log entry are corrupt. For example, a value in the date field that indicates a date of February 30th is corrupt. One skilled in the all would appreciate that the various filtering conditions may be specified in a configuration file. For example, the time range, IP addresses, and so on may be specified in the configuration file. These configuration files may be specified on a customer-by-customer basis.

Figure 7:
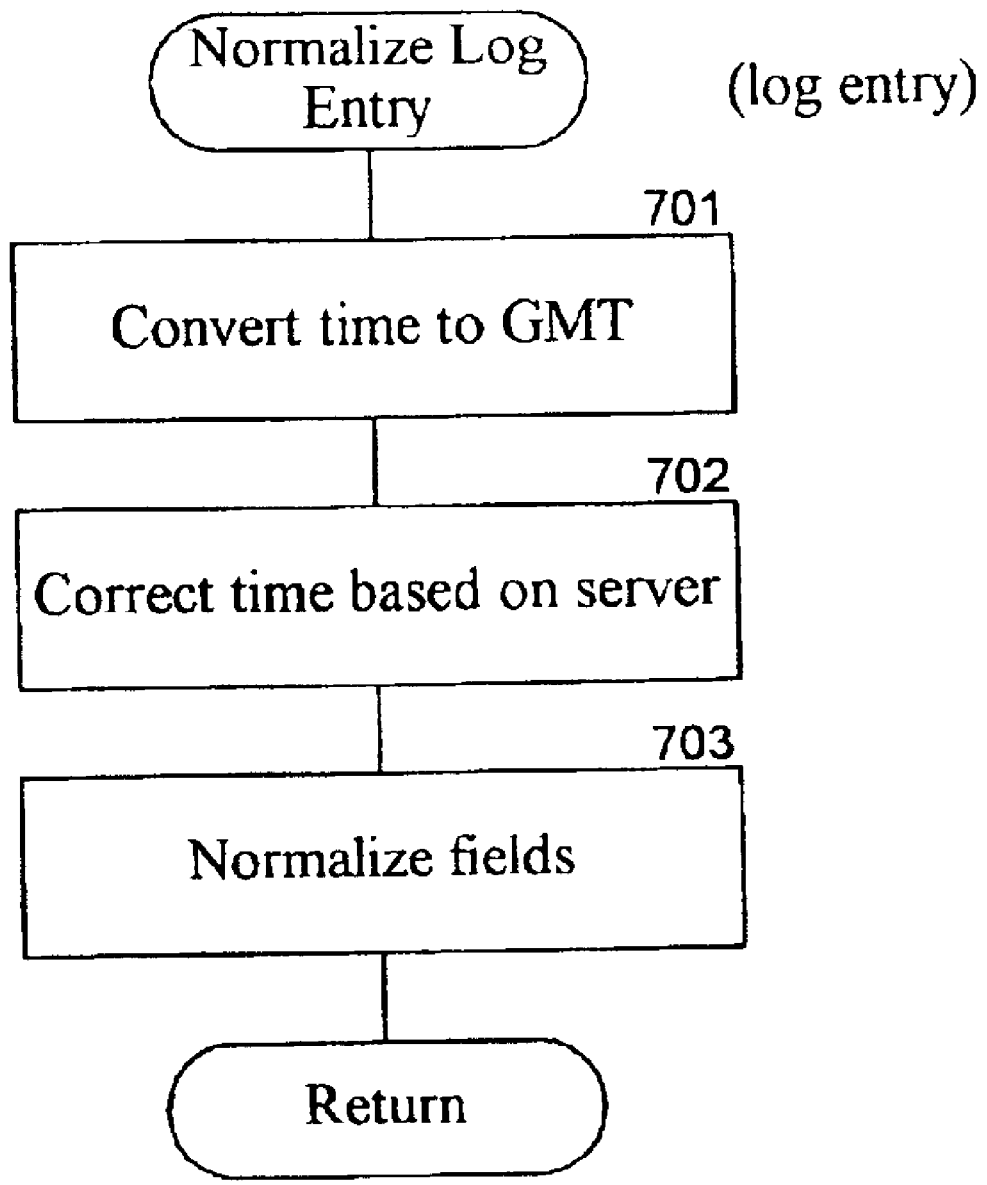
FIG. 7 is a flow diagram illustrating the normalize log entry routine.

FIG. 7 is a flow diagram illustrating the normalize log entry routine. The routine normalizes the values of the fields in the passed log entry. In block 701, the routine converts the time of the log entry into a standard time such as Greenwich Mean Time. In block 702, the routine collects the time based on the variation between the times of the customer web servers. For example, the time of one web server may be five minutes ahead of the time of another web server. This correction may be based on current time information collected from computer systems that generated the events and then correlated to base current time information. In block 703, the routine normalizes the values of the fields of the log entry. This normalization may include processing search strings to place them in a canonical form. For example, a search string of "back pack" may have a canonical form of "backpack." Other normalization of search strings may include stemming of words (e.g., changing "clothes" and "clothing" to "cloth"), synonym matching, and first and last word grouping. The first word grouping for the search strings of "winter clothing" and "winter shoes" results in the string of "winter."

Figure 8:
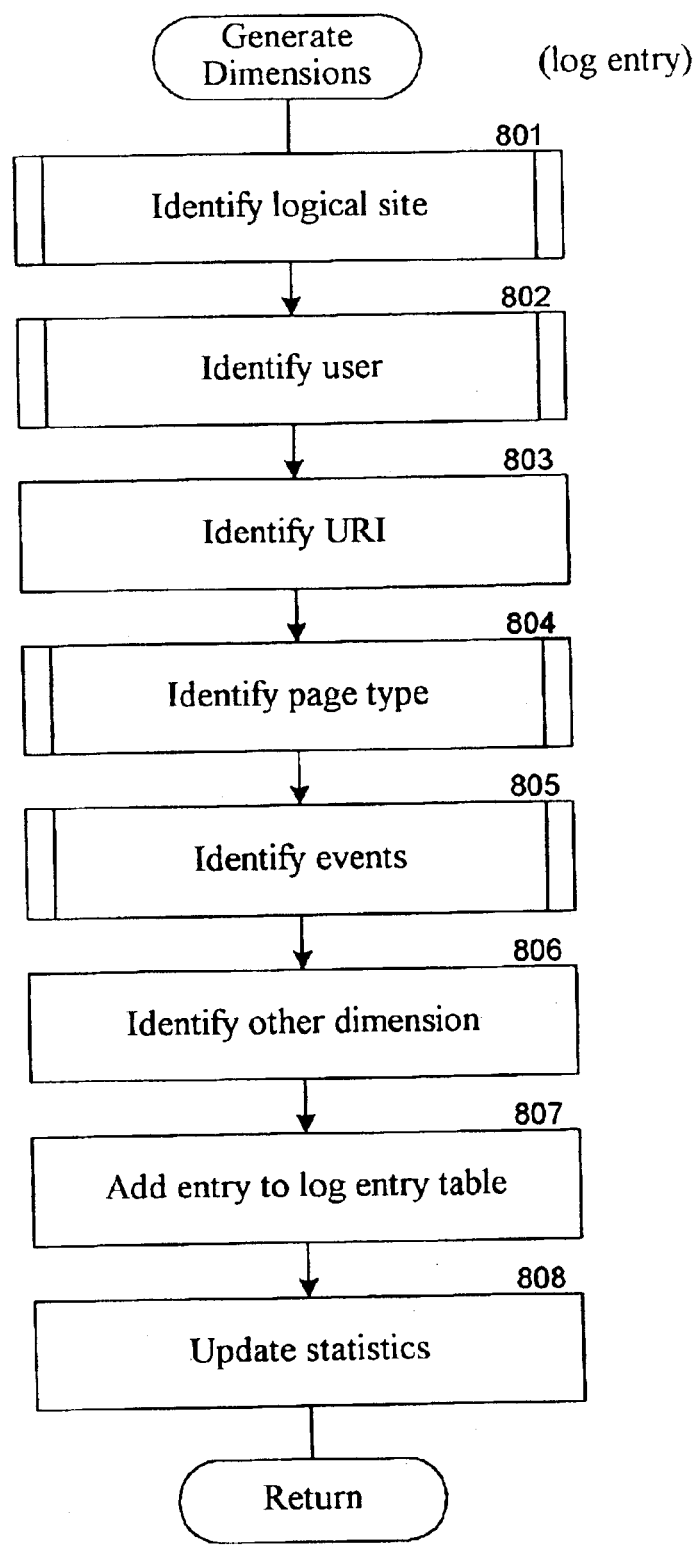
FIG. 8 is a flow diagram of the generate dimensions routine in one embodiment.

FIG. 8 is a flow diagram of the generate dimensions routine in one embodiment. This routine identifies a value for each dimension associated with the passed log entry and ensures that the dimension tables contains entries corresponding to those values. In one embodiment, each entry in a dimension table includes the attribute value (e.g., user identifier) and a hash value. The hash value may be used by the loader when transferring information to the main data warehouse. Also, each sentry has a local identifier, which may be an index into the local dimension table. The loader maps these local identifiers to their corresponding main identifiers that are used in the main data warehouse. In block 801, the routine invokes a routine that identifies the logical site associated with the log entry and ensures that an entry for the logical site is in the logical site dimension table. In block 802, the routine invokes a routine that identifies the user associated with the log entry and ensures that an entry for the user is in the user dimension table. In block 803, the routine invokes a routine that identifies the URI associated with log entry and ensures that an entry for that URI is in the URI dimension table. In block 804, the routine invokes a routine that identifies the page type based on the parser configuration data and ensures that an entry for that page type is in the page type dimension table. In block 805, the routine invokes a routine that identifies the various events associated with the log entry based on the parser configuration data and ensures that an entry for each event type is in the corresponding event table. In block 806, the routine identifies other dimensions (e.g., referrer URI) as appropriate. In block 807, the routine adds an entry to the log entry table that is linked to each of the identified dimensions using the local identifiers. In block 808, the routine updates the statistics information based on the log entry and then returns.

Figure 9:
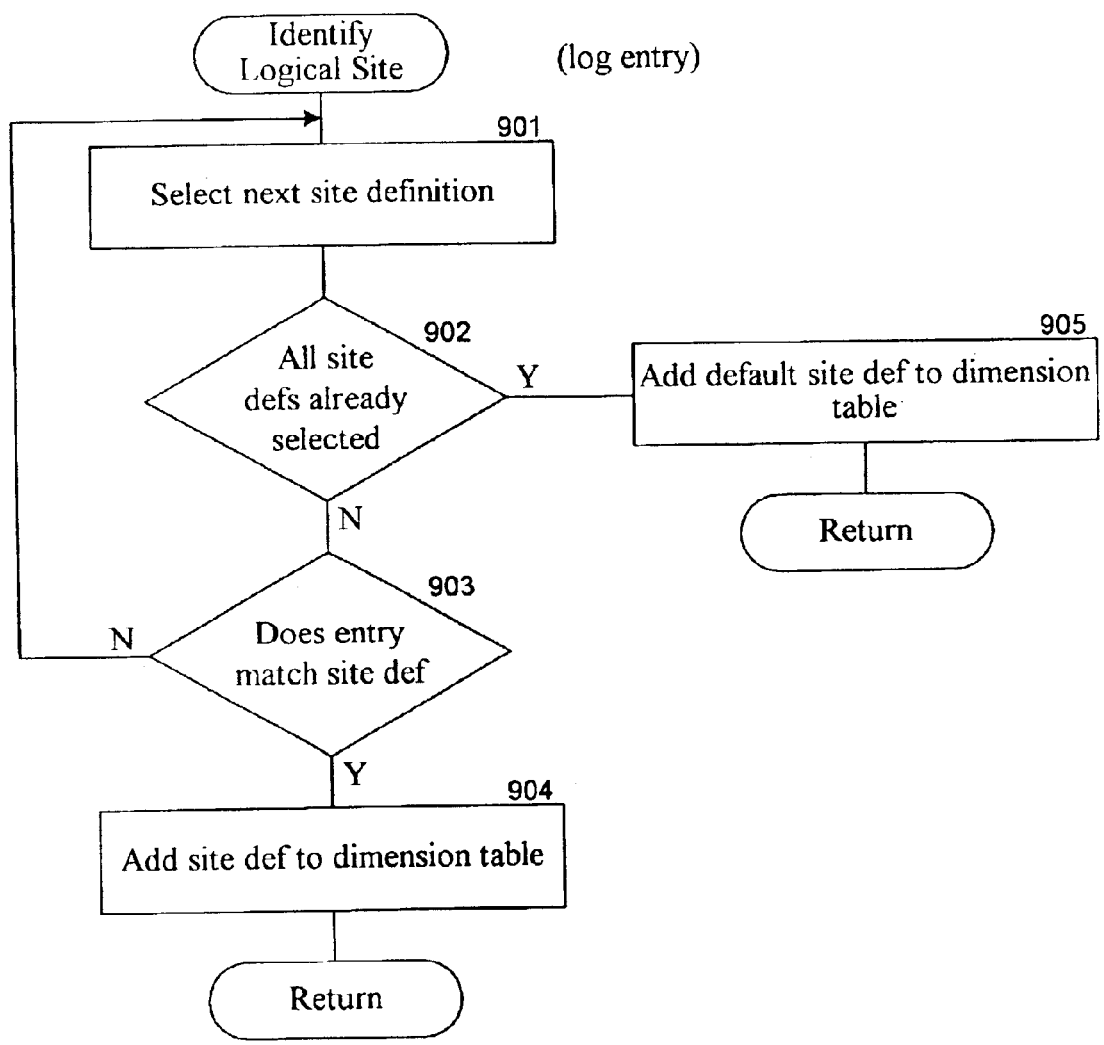
FIG. 9 is a flow diagram of the identify logical site routine in one embodiment.

FIG. 9 is a flow diagram of the identify logical site routine in one embodiment. This routine compares the site information of the passed log entry with the logical site definitions in the parser configuration data. In block 901, the routine selects the next logical site definition from the parser configuration data. In decision block 902, if all the logical site definitions have already been selected, then the routine continues the block 905, else the routine continues at block 903. In decision block 903, if the URI of the log entry matches the selected logical site definition, then the routine continues at block 904, else the routine loops to block 901 to select the next logical site definition. In block 904, the routine updates the logical site dimension table to ensure that it contains an entry for the logical site defined by the selected logical site definition. The routine then returns. In block 905, the routine updates the logical site dimension table to ensure that it contains a default logical site definition and then returns. The log entries that do not map to a logical site definition are mapped to a default logical site.

Figure 10:
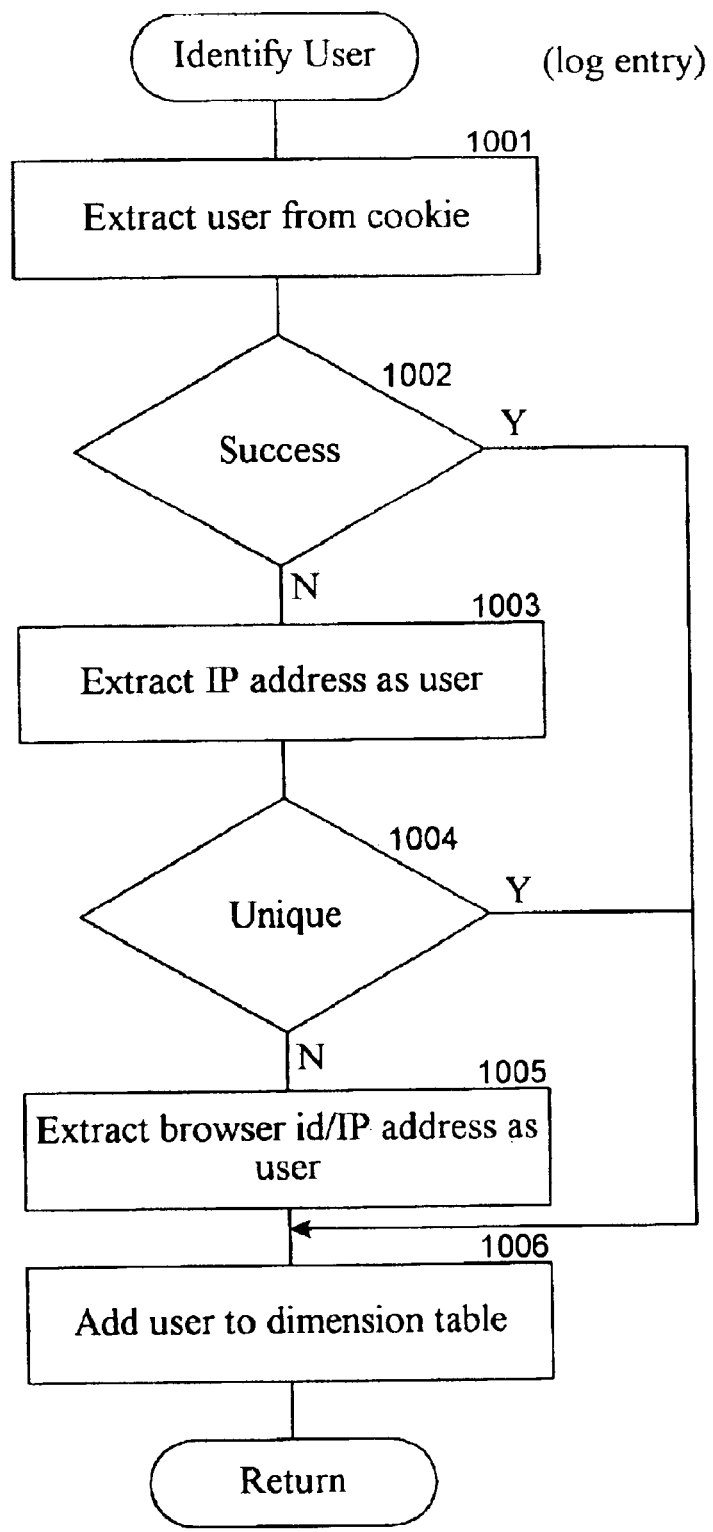
FIG. 10 is a flow diagram of the identify user routine in one embodiment.

FIG. 10 is a flow diagram of the identify user routine in one embodiment. This routine may use various techniques to identify the user associated with the passed log entry. In one embodiment, the selection of the technique is configured based on the customer web site. For example, one customer may specify to use a cookie to identify users. In absence of a user identifier in the cookie, the industry norm is to identify users based on their IP addresses. This routine illustrates a technique in which a combination of cookies and IP addresses are used to identify a user. In block 1001, the routine extracts the user identifier from the cookie associated with the log entry. The format of a cookie may be specified on a customer-by-customer basis. In decision block 1002, if the extraction from the cookie was successful, then tile routine continues at block 1006, else the routine continues at block 1003. The extraction may not be successful if, for example, the log entry did not include a cookie. In block 1003, the routine extracts the IP address from the log entry. In decision block 1004, if the IP address is determined to be unique, then routine continues at block 1006, else the routine continues at block 1005. Certain IP addresses may not be unique. For example, an Internet service provider may use one IP address for many of its users. The Internet service provider performs the mapping of the one IP address to the various users. In block 1005, the routine extracts the browser identifier from the log entry. The combination of IP address and browser identifier may uniquely identify a user. In block 1006, the routine updates the user dimension table to ensure that it has an entry for this user and then returns.

Figure 11:
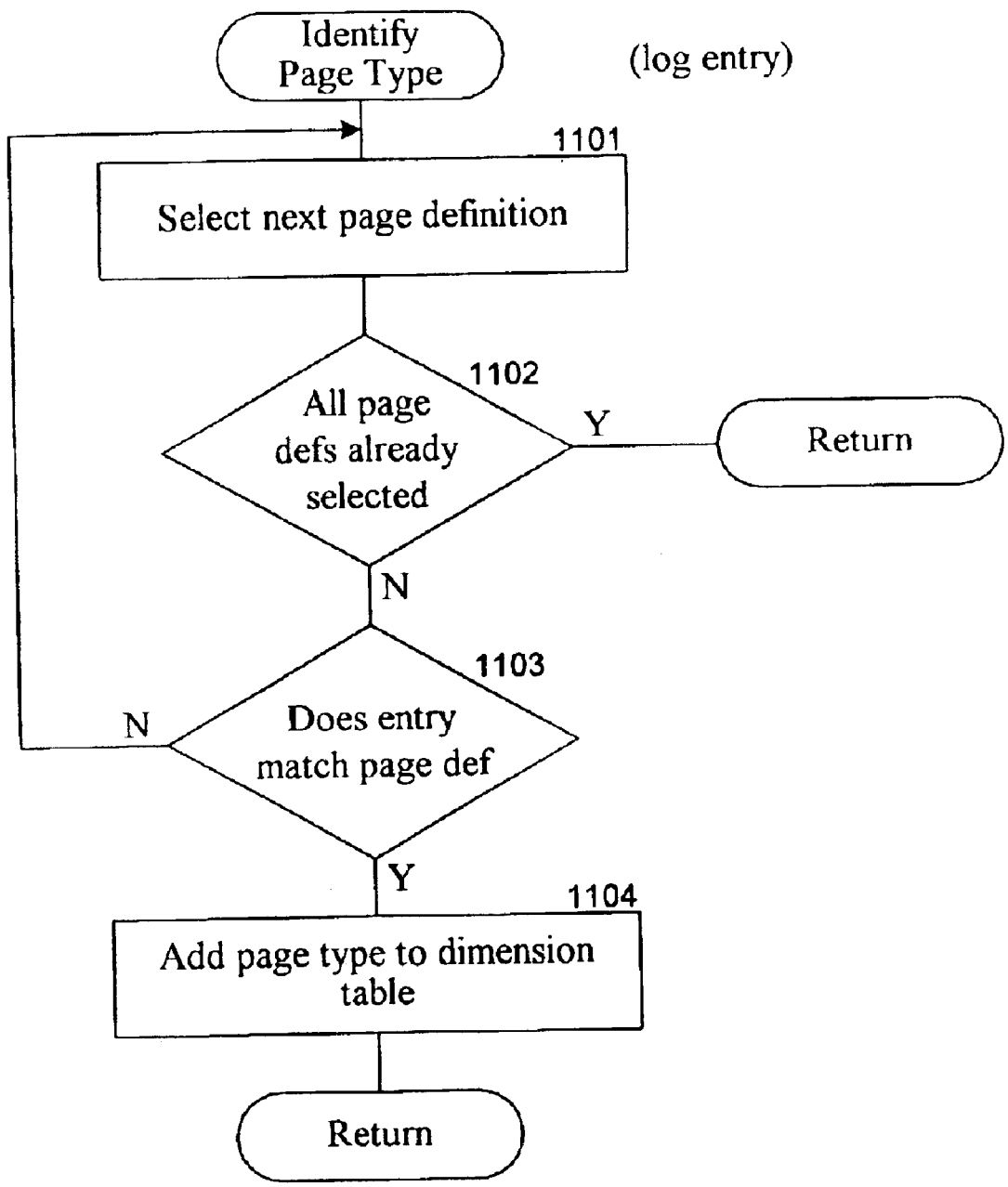
FIG. 11 is a flow diagram of the identify page type routine in one embodiment.

FIG. 11 is a flow diagram of the identify page type routine in one embodiment. This routine uses the pare type definitions of the parser configuration data to identify the page type associated with the log entry. In block 1101, the routine selects the next page type definition from the parser configuration data. In decision block 1101, if all the page type definitions have already been selected, then no matching page type has been found and the routine returns, else the routine continues at block 1103. In decision block 1103, if the log entry matches the selected page type definition, then the routine continues at block 1104, else the routine loops to block 1101 to select the next page type definition. In block 1104, the routine updates the page type dimension table to ensure that it contains an entry for the page type represented by the selected page type definition. The routine then returns.

Figure 12:
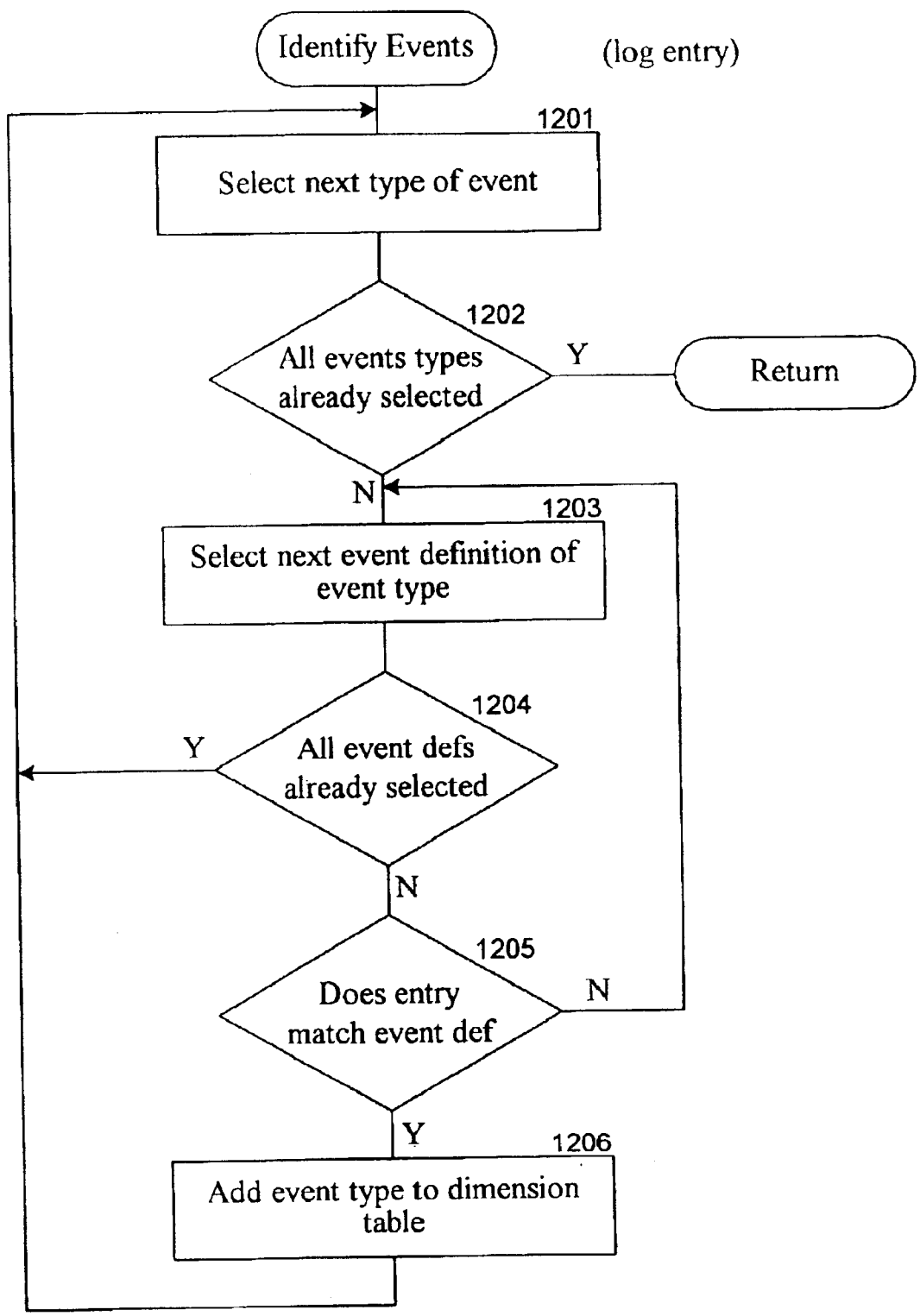
FIG. 12 is a flow diagram illustrating the identify events routine in one embodiment.

FIG. 12 is a flow diagram illustrating the identify events routine in one embodiment. This routine determines whether the log entry corresponds to any of the events specified in the parser configuration data. In block 1201, the routine selects the next type of event from the parser configuration data. In decision block 1202, if all the event types have already been selected, then the routine returns, else the routine continues at block 1203. In block 1203, the routine selects the next event definition of the selected event type. In decision block 1204, if all the event definitions of the selected event type have already been selected, then the log entry does not correspond to this type of event and the routine loops to block 1201 to select the next type of event, else the routine continues at block 1205. In block 1205, if the log entry matches the selected event definition, then the routine continues at block 1206, else the routine loops to block 1203 to select the next event definition of the selected event type. In block 1206, the routine updates the dimension table for the selected type of the event to ensure that it contains an entry for the selected event definition. The routine then loops to block 1201 to select the next type of event. In this way, the routine matches no more than one event definition for a given event type. For example, if there are two event definitions for the event type "Keyword Search," then if the first one processed matches, then the second one is ignored.

Figure 13:
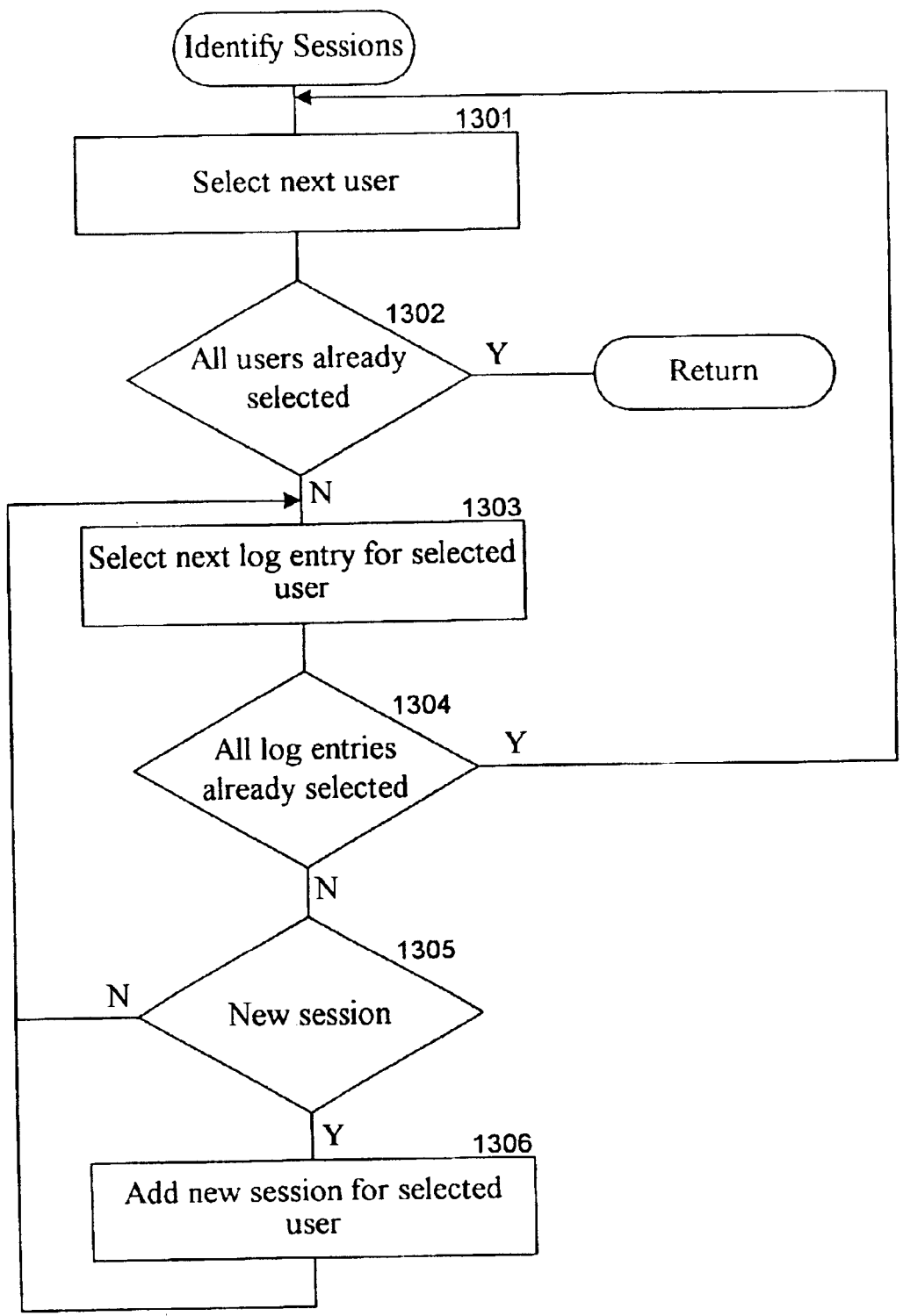
FIG. 13 is a flow diagram illustrating the identify sessions routine in one embodiment.

FIG. 13 is a flow diagram illustrating the identify sessions routine in one embodiment. This routine scans the log entry table of the local data warehouse to identify user sessions. In one embodiment, a user session may be delimited by a certain period of inactivity (e.g., thirty minutes). The criteria for identifying a session may be configurable on a customer-by-customer basis. In block 1301, the routine selects the next user from the user dimension table. In decision block 1302, if all the users have already been selected, then the routine returns, else the routine continues at block 1303. In block 1303, the routine selects the next log entry for the selected user in time order. In decision block 1304, if all log entries for the selected user have already been selected, then the routine loops to block 1301 to select the next user, else the routine continues at block 1305. In decision block 1305, if the selected log entry indicates that a new session is starting (e.g., its time is more than 30 minutes greater than that of the last log entry processed), then the routine continues at block 1306, else the routine loops to block 1303 to select the next log entry for the selected user. In block 1306, the routine updates a session fact table to add an indication of the new session. The routine then loops to block 1303 to select the next log entry for the selected user. The routine may also update the log entries to reference their sessions.

Figure 14:
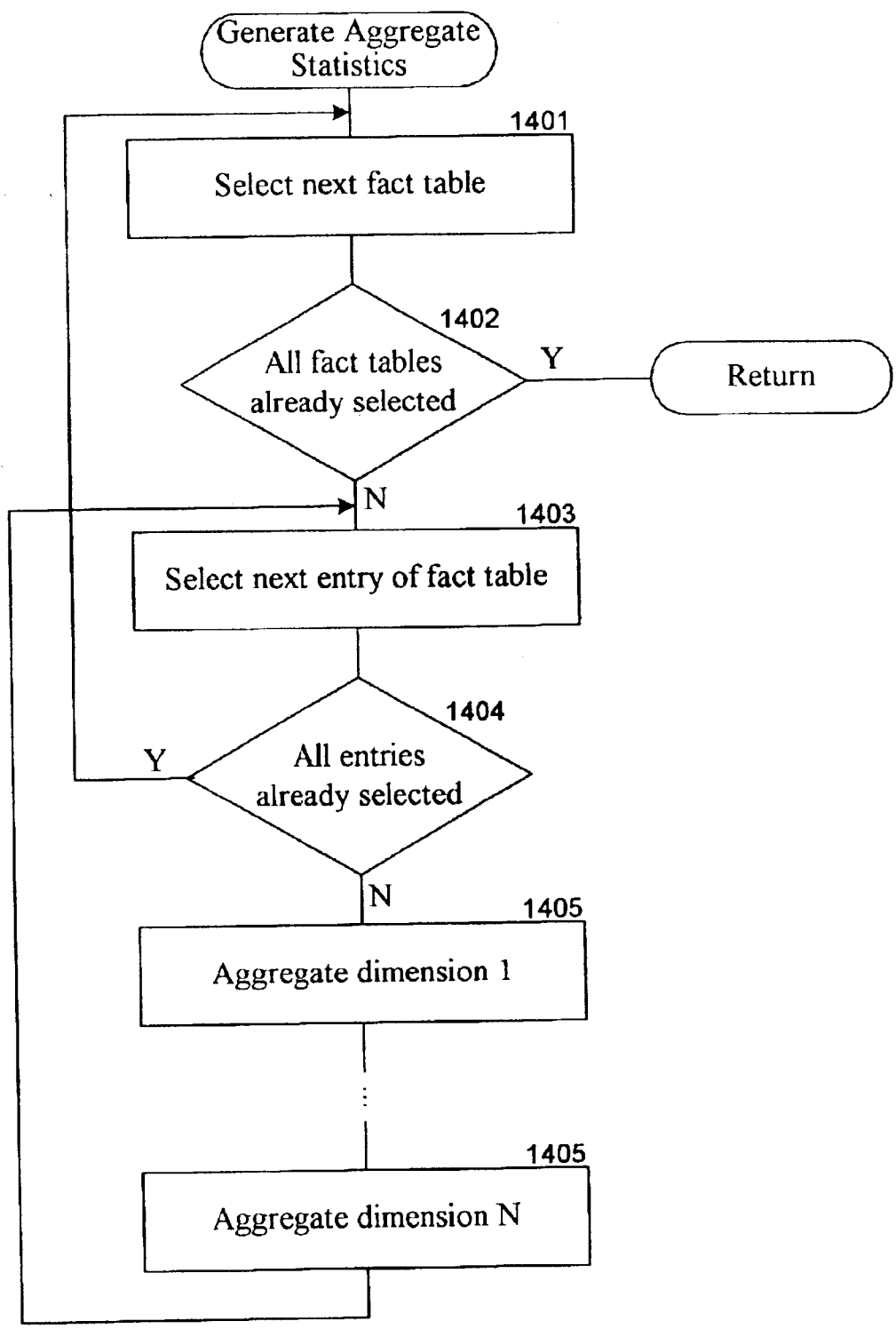
FIG. 14 is a flow diagram of the generate aggregate statistics routine in one embodiment.

FIG. 14 is a flow diagram of the generate aggregate statistics routine in one embodiment. This routine generate statistics based on analysis of the fact and dimension tables used by the parser. In block 1401, the routine selects the next fact table of intent. In decision block 1402, if all the fact tables have already been selected, then the routine returns, else the routine continues at block 1403. In block 1403, the routine selects the next entry of the selected fact table. In decision block 1404, if all the entries of the selected fact table have already been selected, then the routine loops to block 1401 to select the next fact table, else the routine continues at block 1405. In block 1405, the routine aggregates various statistics about the selected fact table. The routine then loops to block 1404 to select the next entry of the fact table.

Figure 15:
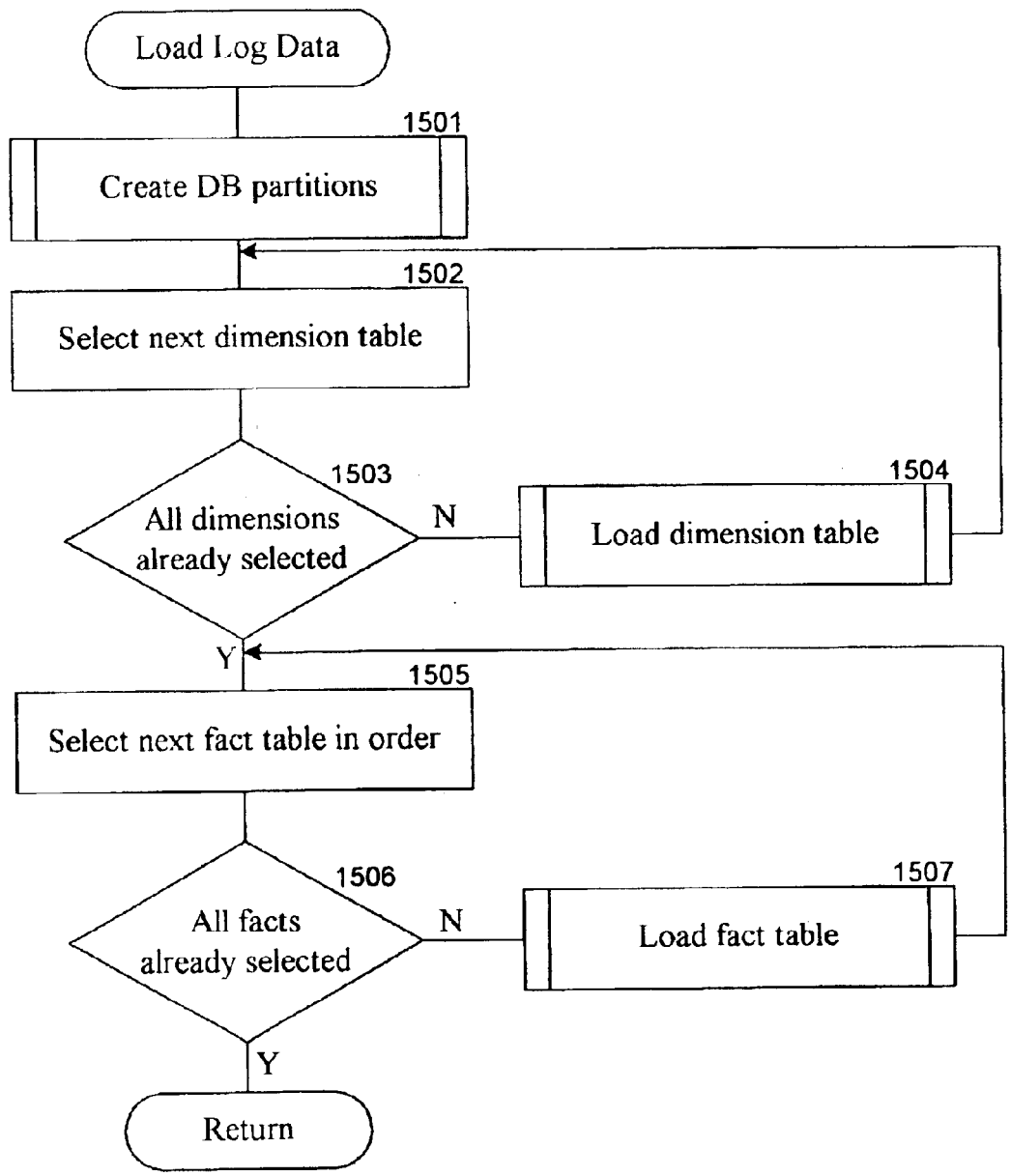
FIG. 15 is a flow diagram of the import log data routine implementing the importer in one embodiment.
Figure 16:
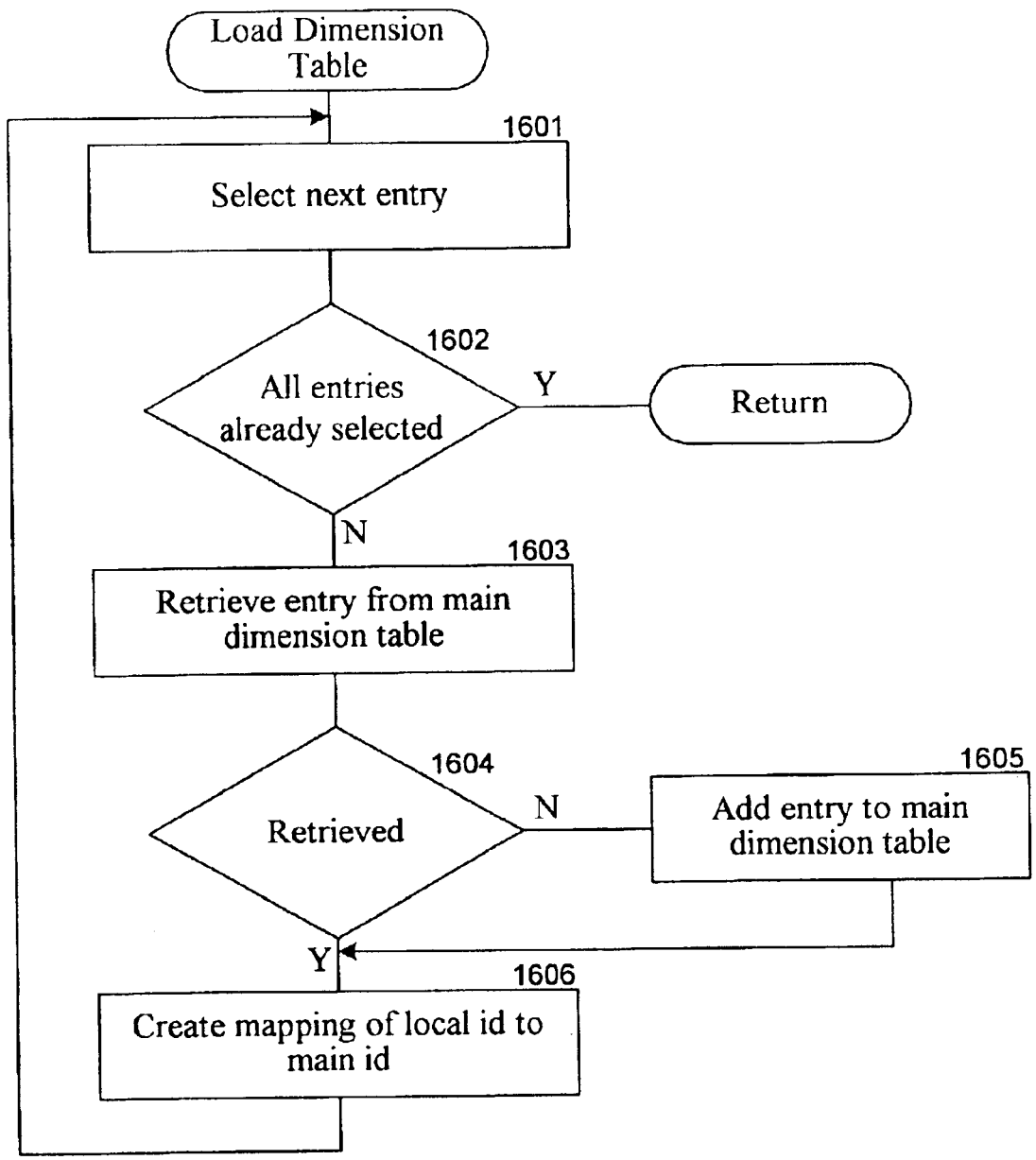
FIG. 16 is a flow diagram of the load dimension table routine and one embodiment.
Figure 17:
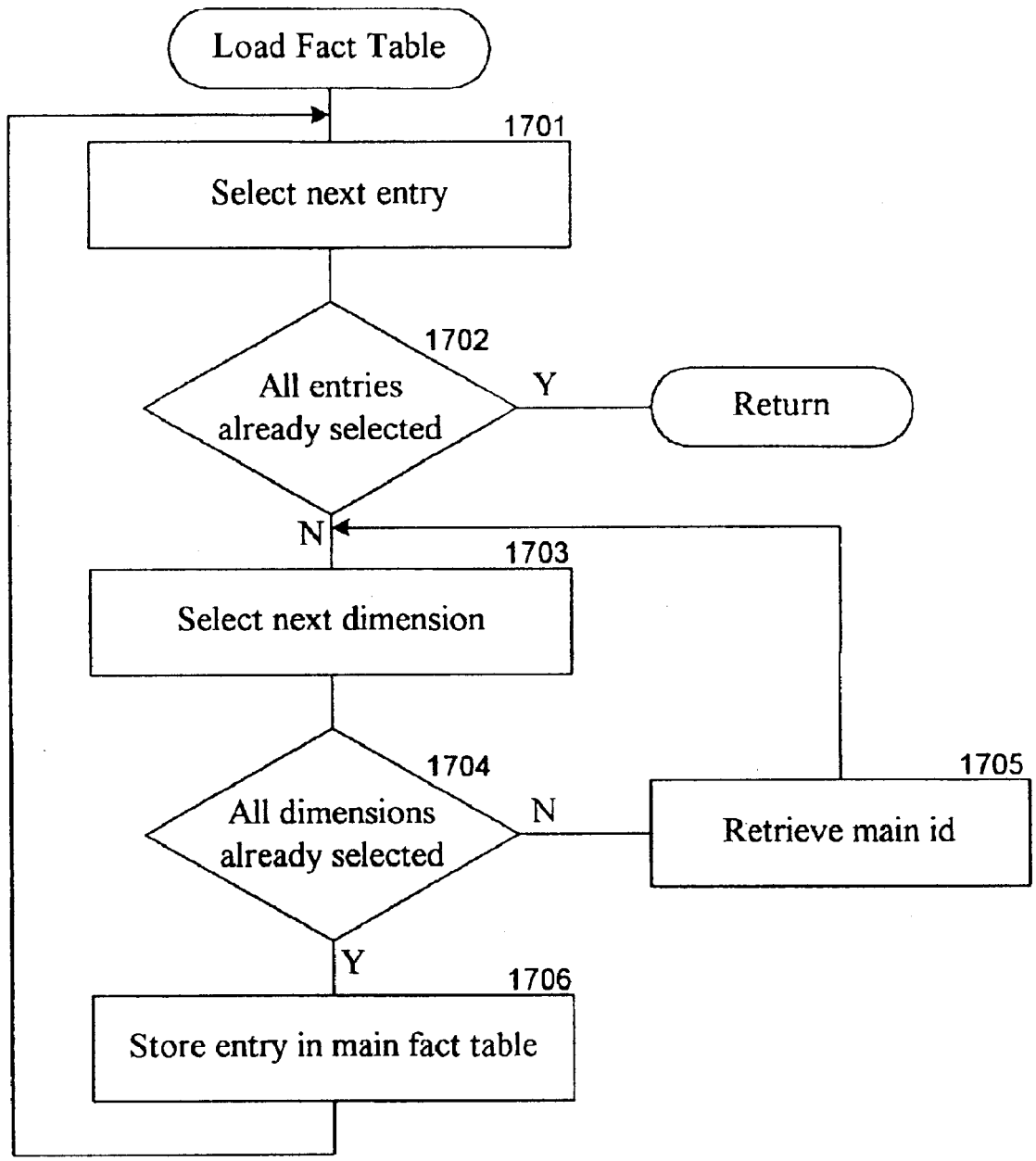
FIG. 17 is a flow diagram of the load fact table routine in one embodiment.

FIGS. 15–17 are flow diagrams illustrating components of the loader in one embodiment. FIG. 15 is a flow diagram of the load log data routine implementing the main routine of the loader in one embodiment. This routine controls the moving of the data from the local data warehouse (created and used by the parser) into the main data warehouse. In block 1501, the routine invokes the create partitions routine to create partitions for the main data warehouse as appropriate. In blocks 1502–1504, the routine loops loading the dimension tables into the main data warehouse. In block 1502, the routine selects the next dimension table. In decision block 1503, if all the dimension tables have already been selected, then the routine continues at block 1505, else the routine continues at block 1504. In block 1504, the routine invokes the load dimension table routine for the selected dimension table. The routine then loops to block 1502 to select the next dimension table. In blocks 1505–1507, the routine loops adding the entries to the fact tables of the main data warehouse. In block 1505, the routine selects the next fact table in order. Tile order in which the fact tables are to be loaded may be specified by configuration information. The fact tables may be loaded in order based on their various dependencies. For example, a log entry fact table may be dependent on a user dimension table that is itself a fact table. In decision block 1506, if all the fact tables have already been loaded, then the routine returns, else the routine continues at block 1507. In block 1507, the routine invokes the load fact table routine for the selected fact table. The routine then loops to block 1505 to select the next fact table.

FIG. 16 is a flow diagram of the load dimension table routine in one embodiment. This routine maps the local identifiers used in the local data warehouse to the main identifiers used in the main data warehouse. In block 1601, the routine selects the next entry from the dimension table. In decision block 1602, if all the entries of the dimension table have already been selected, then the routine returns, else the routine continues at block 1603. In block 1603, the routine retrieves an entry from the dimension table of the main data warehouse corresponding to the selected entry. In decision block 1604, if the entry is retrieved, then the routine continues at block 1606, else the dimension table does not contain an entry and the routine continues at block 1605. In block 1605, the routine adds an entry to the dimension table of the main data warehouse corresponding to the selected entry from the dimension table of the local data warehouse. In block 1606, the routine creates a mapping of the local identifier (e.g., index into the local dimension table) of the selected entry to the main identifier (e.g., index into the main dimension table) for that selected entry. The routine then loops to block 1601 to select the next entry of the dimension table.

FIG. 17 is a flow diagram of the load fact table routine in one embodiment. This routine adds the facts of the local data warehouse to the main data warehouse. The routine maps the local identifiers for the dimensions used in the local warehouse to the main identifiers of dimensions used in the main data warehouse. In block 1701, the routine selects the next entry in the fact table. In decision block 1702, if all the entries of the fact table have already been selected, then the routine returns, else the routine continues at block 1703. In block 1703, the routine selects the next dimension for the selected entry. In decision block 1704, if all the dimensions for the selected entry have already been selected, then the routine continues at block 1706, else the routine continues at block 1705. In block 1705, the routine retrieves the main identifier for the selected dimension and then loops to block 1703 to select the next dimension. In block 1706, the routine stores an entry in the fact table of the main data warehouse. The routine then loops to block 1701 to select the next entry in the fact table.

Figure 18:
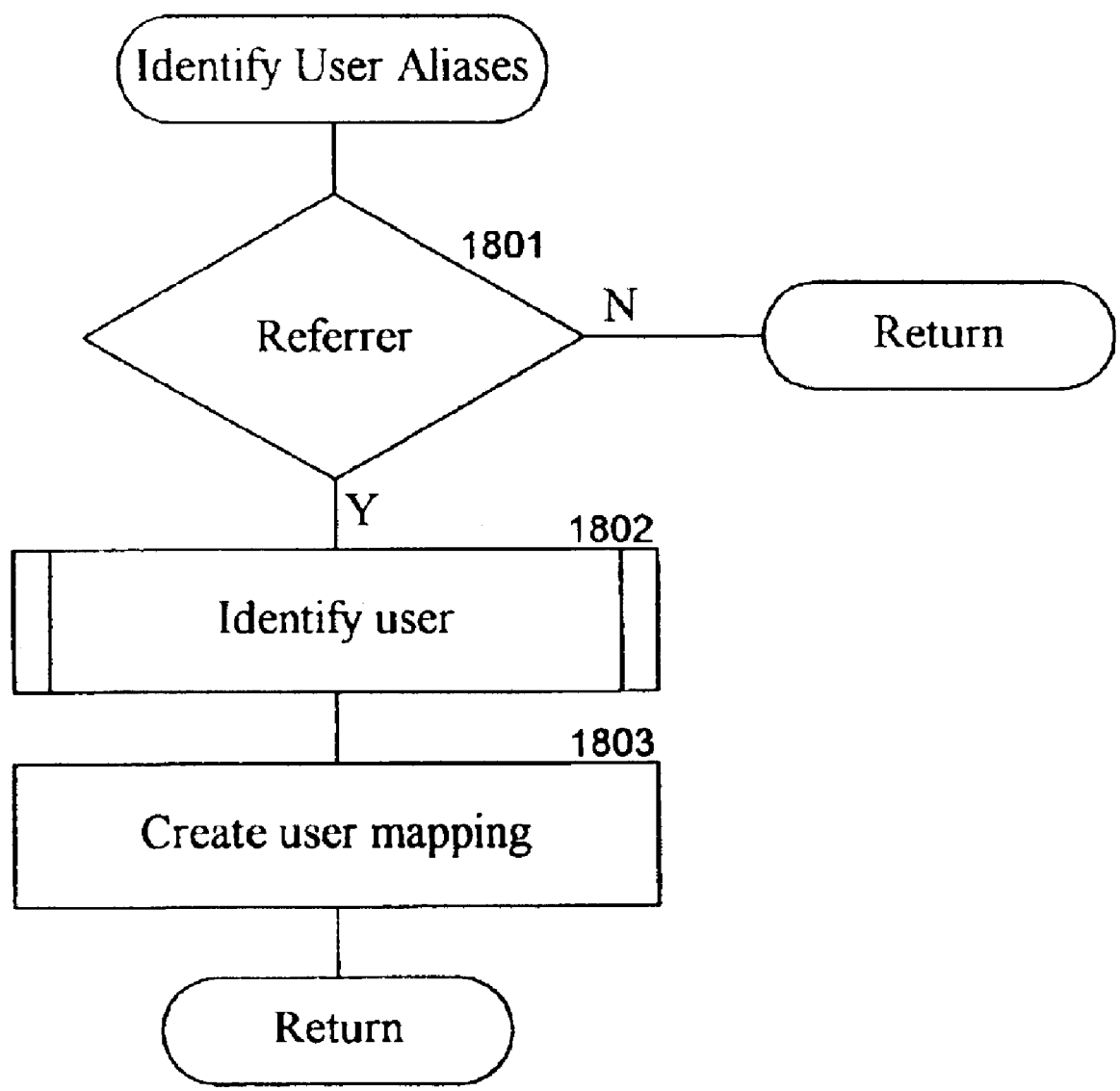
FIG. 18 is a flow diagram illustrating the identify user aliases routine in one embodiment.

FIG. 18 is a flow diagram illustrating the identify user aliases routine in one embodiment. This routine tracks the different user identifiers as a user switches from one web site to another. In particular, the routine maps the user identifiers used by a referrer web site to the user identifiers used by the referred-to web site. In this way, the same user can be tracked even though different web sites use different identifiers for that user. This routine may be invoked as part of the parsing of the log files. In decision block 1801, if the log entry indicates a referrer web site, then the routine continues at block 1802, else the routine returns. In block 1802, the routine identifies the user identifier for the referrer web site. In block 1803, the routine creates a mapping between the referrer user identifier and the referred-to user identifier. The routine then returns.

From the above description it will be appreciated that although specific embodiments of the technology have been described for purposes of illustration, various modifications may be made without deviating from the spirit and scope of the invention. For example, the processing of the parser may be performed by the data collection component before sending the data to the data warehouse server. Accordingly, the invention is not limited except by the appended claims.

What is claimed is:

1. A method in a computer system for providing information relating to entries of log files, the method comprising:

receiving a plurality of log files;

for each entry of each log file, determining whether the entry contains a query; and when it is determined that the entry contains a query,
normalizing the query; and storing the normalized query in a database in association with other information of the entry;

receiving from a user a request for information based on analysis of the log files;

identifying information responsive to the received request based on the normalized queries stored in the database; and sending the identified information to the user.

2. The method of claim 1 including:

identifying entries of the log files that represent requests for web pages;

identifying a user associated with each identified entry; and for each identified user, selecting the identified entries associated with the identified user as a navigation path of web pages for the identified user.

3. The method of claim 2 wherein the identified information responsive to the received request is further based on a navigation path of the identified user.

4. The method of claim 1 wherein the database is a main database and wherein the storing of the normalized query in the main database includes:

providing a fact table and a dimension table corresponding to a fact table and a dimension table of the main database;

storing the normalized queries in the provided fact table with a reference to the provided dimension table;

analyzing the normalized queries stored in the provided fact table; and after analyzing the normalized queries, transferring the normalized queries to the fact table of the main database with a reference to the dimension table of the main database.

5. The method of claim 1 wherein a query has an associated time and including:

sending to servers that provide log files a request for the current time of that server;

receiving from each server the current time of that server; and storing a time associated with each normalized query based on differences in times between the servers.

6. The method of claim 1 wherein determining whether the entry contains a query includes:

providing customer-specific event definitions for a customer; and determining from the customer-specific event definitions when an entry contains a query.

7. A computer-readable medium containing instructions for controlling a computer system to provide information relating to entries of log files, by a method comprising:

for each entry of each log file, determining whether the entry contains a query; and when it is determined that the entry contains a query,
normalizing the query; and storing the normalized query in a database in association with other information of the entry;

generating information based on the normalized queries stored in the database; and providing the generated information to a user.

8. The computer-readable medium of claim 7 wherein the database is a main database and wherein the storing of the normalized query in the main database includes:

providing a fact table and a dimension table corresponding to a fact table and a dimension table of the main database;

storing the normalized queries in the provided fact table with a reference to the provided dimension table;

analyzing the normalized queries stored in the provided fact table; and after analyzing the normalized queries, transferring the normalized queries to the fact table of the main database with a reference to the dimension table of the main database.

9. The computer-readable medium of claim 7 wherein a query has an associated time and including:

sending to servers that provide log files a request for the current time of that server;

receiving from each server the current time of that server; and storing a time associated with each normalized query based on differences in times between the servers.

10. The computer-readable medium of claim 7 wherein determining whether the entry contains a query includes:

providing customer-specific event definitions for a customer; and determining from the customer-specific event definitions when an entry contains a query.

11. The computer-readable medium of claim 7 including:

identifying entries of the log files that represent requests for web pages;

identifying a user associated with each identified entry; and for each identified user, selecting the identified entries associated with the identified user as a navigation path of web pages for the identified user.

12. The computer-readable medium of claim 11 wherein the identified information responsive to the received request is further based on a navigation path of the identified user.

* * * * *

UNITED STATES PATENT AND TRADEMARK OFFICE
CERTIFICATE OF CORRECTION

PATENT NO. : 6,873,981 B2
DATED : March 29, 2005
INVENTOR(S) : Krishnamohan Nareddy et al.

It is certified that error appears in the above-identified patent and that said Letters Patent is hereby corrected as shown below:

Column 1,
Line 32, "specific is layout" should be -- specific layout --;

Column 5,
Line 36, "dimension is tables" should be -- dimension tables --;

Column 6,
Line 12, "tile data" should be -- the data --;

Column 7,
Line 30, "Tile parser" should be -- The parser --;

Column 14,
Line 23, "pare type" should be -- page type --;

Column 15,
Line 54, "Tile order" should be -- The order --.

Signed and Sealed this

Thirteenth Day of September, 2005

JON W. DUDAS
*Director of the United States Patent and Trademark Office*